US009043219B2

(12) United States Patent
Piersol

(10) Patent No.: US 9,043,219 B2
(45) Date of Patent: May 26, 2015

(54) AUTOMATIC AND SEMI-AUTOMATIC SELECTION OF SERVICE OR PROCESSING PROVIDERS

(75) Inventor: Kurt W. Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 488 days.

(21) Appl. No.: 12/879,148

(22) Filed: Sep. 10, 2010

(65) Prior Publication Data

US 2012/0066018 A1 Mar. 15, 2012

(51) Int. Cl.
*G06Q 10/00* (2012.01)
*G06Q 10/10* (2012.01)
*G06Q 10/06* (2012.01)

(52) U.S. Cl.
CPC ........ *G06Q 10/10* (2013.01); *G06F 2209/5015* (2013.01); *G06Q 10/0631* (2013.01)

(58) Field of Classification Search
CPC .............................................. G06F 2209/5015
USPC ................................................ 705/7.11–7.42
See application file for complete search history.

(56) References Cited

U.S. PATENT DOCUMENTS

| | | | |
|---|---|---|---|
| 8,018,518 B2 | 9/2011 | Nobels | |
| 2005/0219263 A1 | 10/2005 | Thompson et al. | |
| 2006/0114488 A1 | 6/2006 | Motamed | |
| 2006/0212359 A1* | 9/2006 | Hudgeon | 705/26 |
| 2006/0218127 A1 | 9/2006 | Tate et al. | |
| 2006/0253478 A1 | 11/2006 | Graham et al. | |
| 2006/0287950 A1* | 12/2006 | Steinberg et al. | 705/39 |
| 2007/0047781 A1 | 3/2007 | Hull et al. | |
| 2007/0156632 A1* | 7/2007 | Wolff et al. | 707/1 |
| 2007/0226374 A1* | 9/2007 | Quarterman et al. | 709/250 |
| 2008/0030599 A1 | 2/2008 | Stavely et al. | |
| 2008/0040162 A1 | 2/2008 | Brice | |
| 2008/0052396 A1 | 2/2008 | Tell et al. | |
| 2008/0059390 A1* | 3/2008 | Cox et al. | 706/12 |
| 2008/0129667 A1 | 6/2008 | Zehner et al. | |
| 2008/0247004 A1* | 10/2008 | Yeung | 358/486 |
| 2009/0012887 A1* | 1/2009 | Taub et al. | 705/34 |

(Continued)

FOREIGN PATENT DOCUMENTS

| | | |
|---|---|---|
| CN | 1499414 | 5/2004 |
| CN | 101147130 | 3/2008 |

(Continued)

OTHER PUBLICATIONS

Wu et al. "User-Preference Based Service Selection Using Fuzzy Logic" (2010) CNSM, p. 342-345 (http://ieeexplore.ieee.org/stamp/stamp.jsp?arnumber=05691228).*

(Continued)

*Primary Examiner* — Sujay Koneru

(74) *Attorney, Agent, or Firm* — Patent Law Works LLP

(57) ABSTRACT

A system and method for automatic or semi-automatic selection of service or processing providers is disclosed. In one embodiment of the present invention allows the user to input a set of preferences, and from that input automatically selects a service or processing provider that matches the attributes that are important the user as derived from the input preferences. In another embodiment, the process is semi-automatic in that the user provides a set of preferences, and the present invention filters the service or processing providers and presents a limited number of them that match the user's preferences and from which the user can select one for processing of the particular task.

20 Claims, 12 Drawing Sheets

(56) References Cited

U.S. PATENT DOCUMENTS

| | | | |
|---|---|---|---|
| 2009/0086945 A1* | 4/2009 | Buchanan et al. | 379/201.02 |
| 2009/0094275 A1 | 4/2009 | Patton et al. | |
| 2009/0132345 A1* | 5/2009 | Meyssami et al. | 705/10 |
| 2010/0083121 A1* | 4/2010 | Famolari et al. | 715/736 |
| 2010/0179816 A1 | 7/2010 | Wu et al. | |
| 2010/0179882 A1* | 7/2010 | Rigole | 705/26 |
| 2010/0239176 A1 | 9/2010 | Yamakado | |
| 2011/0057884 A1* | 3/2011 | Gormish et al. | 345/173 |
| 2011/0060910 A1 | 3/2011 | Gormish et al. | |
| 2011/0137818 A1* | 6/2011 | Goad et al. | 705/347 |
| 2011/0145094 A1* | 6/2011 | Dawson et al. | 705/26.63 |
| 2011/0145691 A1* | 6/2011 | Noyes | 715/230 |
| 2011/0231745 A1 | 9/2011 | Levesque et al. | |

FOREIGN PATENT DOCUMENTS

| | | |
|---|---|---|
| JP | 08-335214 | 12/1996 |
| JP | 09-325879 | 12/1997 |
| JP | 2000-69304 | 3/2000 |
| JP | 2000-287164 | 10/2000 |
| JP | 20045700 | 1/2004 |
| JP | 2006-331122 | 12/2006 |
| JP | 2007-257670 | 4/2007 |
| JP | 2007-328489 | 12/2007 |
| JP | 2008-097435 | 4/2008 |
| JP | 2008-524735 | 7/2008 |
| JP | 2008-204469 | 9/2008 |
| JP | 2008537816 | 9/2008 |
| JP | 2009-003596 | 1/2009 |
| JP | 2009-075879 | 4/2009 |
| WO | 2005054933 | 6/2005 |
| WO | WO 2006100194 | 9/2006 |
| WO | WO-2006100194 | 9/2006 |

OTHER PUBLICATIONS

Butler et al. "Enabling e-transactions with multi-attribute preference models" (2008) European Journal of Operational Research 186 (2008) 748-765 (http://opim.wharton.upenn.edu/~kartikh/reading/kerem.pdf).*

Zadeh, L.A., "Fuzzy Sets", Department of Electrical Engineering and Electronics Research Laboratory, University of California, Berkeley, California, Information and Control 8, pp. 338-353 (1965).

Dempster, A.P., "Upper and Lower Probabilities Induced by a Multivalued Mapping", The Annals of Mathematical Statistics, vol. 38, No. 2 (Apr. 1967), pp. 325-339.

Shafer, Glenn, "A Mathematical Theory of Evidence", Princeton University Press, 1976, pp. 1-15.

Anand, Paul, "Foundations of Rational Choice Under Risk", Clarendon Press, Oxford University Press 1993.

Zadeh, L.A., "Fuzzy Sets as a Basis for a Theory of Possibility", Fuzzy Sets and Systems 100 Supplement (1999), Computer Science Division, Department of Electrical Engineering and Computer Science and the Electronics Research Laboratory, University of California, Berkeley, CA 94720, USA, pp. 9-34.

PCT Search Report and Written Opinion, PCT Patent Application No. PCT/JP2011/064600, Jun. 20, 2011, 12 pages.

PCT Search Report and Written Opinion, PCT Patent Application No. PCT/JP2011/065128, Jun. 24, 2011, 10 pages.

PCT Search Report and Written Opinion, PCT Patent Application No. PCT/JP2011/065236, Jun. 27, 2011, 11 pages.

Anand, Paul, "Foundations of Rational Choice Under Risk", Clarendon Press, Oxford University Press 1993, pp. 1-11.

PCT Search Report and Written Opinion, PCT Patent Application No. PCT/JP2011/070675, Dec. 6, 2011, 13 pages.

United States Office Action, U.S. Appl. No. 12/826,578, Mar. 28, 2012, 22 pages.

United States Office Action, U.S. Appl. No. 12/826,556, Apr. 27, 2012, 23 pages.

Australian Patent Examination Report for AU Patent Application No. 2011299801, dated Feb. 10, 2014, 4 pages.

Federal Court of Australia; *Research Affiliates LLC* v *Commissioner of Patents*, dated Feb. 13, 2013, 16 pages.

Federal Court of Australia; *RPL Central Pty Ltd.* v *Commissioner of Patents*, dated Aug. 30, 2013, 16 pages.

*National Research Development Corporation* v *Commissioner of Patents*, dated Mar. 6, 1959, 15 pages.

Korean Office Action for KR Application 10-2013-7005942, dated Jul. 17, 2014, 11 pages.

Chinese Office Action for Application No. 2011800430095, dated Nov. 4, 2014, 23 pages.

European Search Report for PCT Application No. PCT/JP2011070675, dated Jan. 8, 2015, 5 pages.

* cited by examiner

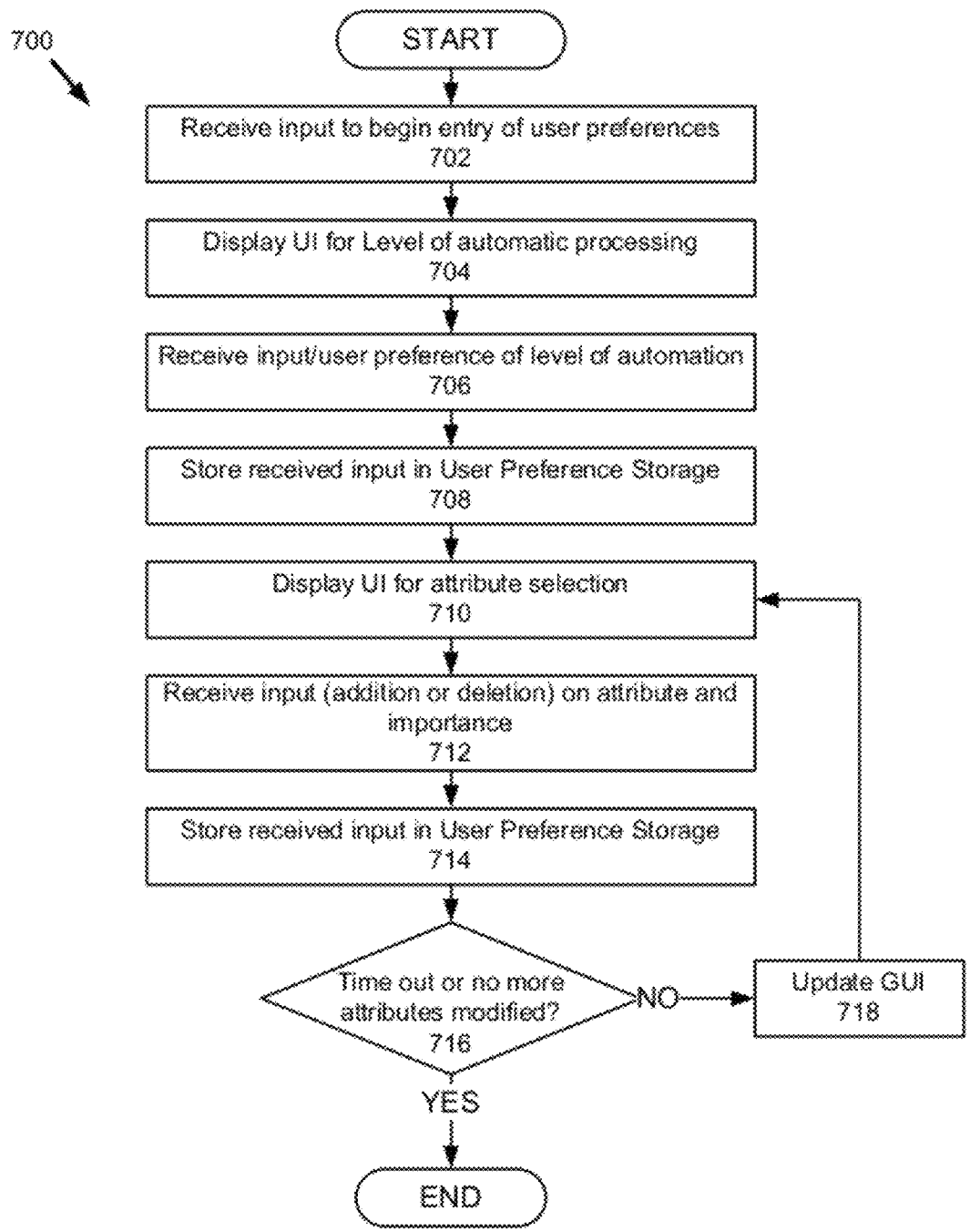
Figure 7  Displaying GUI and collecting user preferences

User Preference GUI

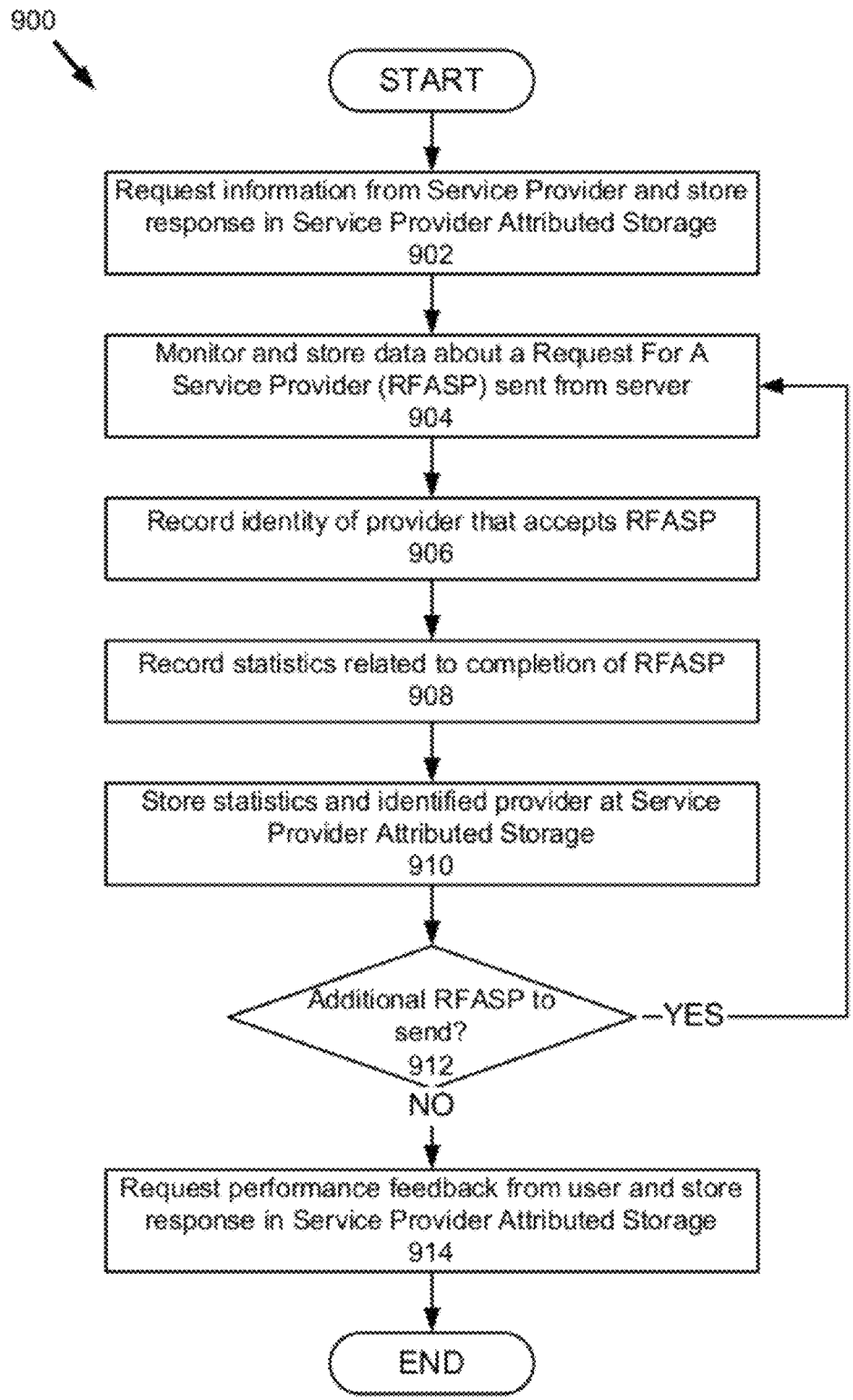
Figure 9 — Collecting and storing Service Provider attributes

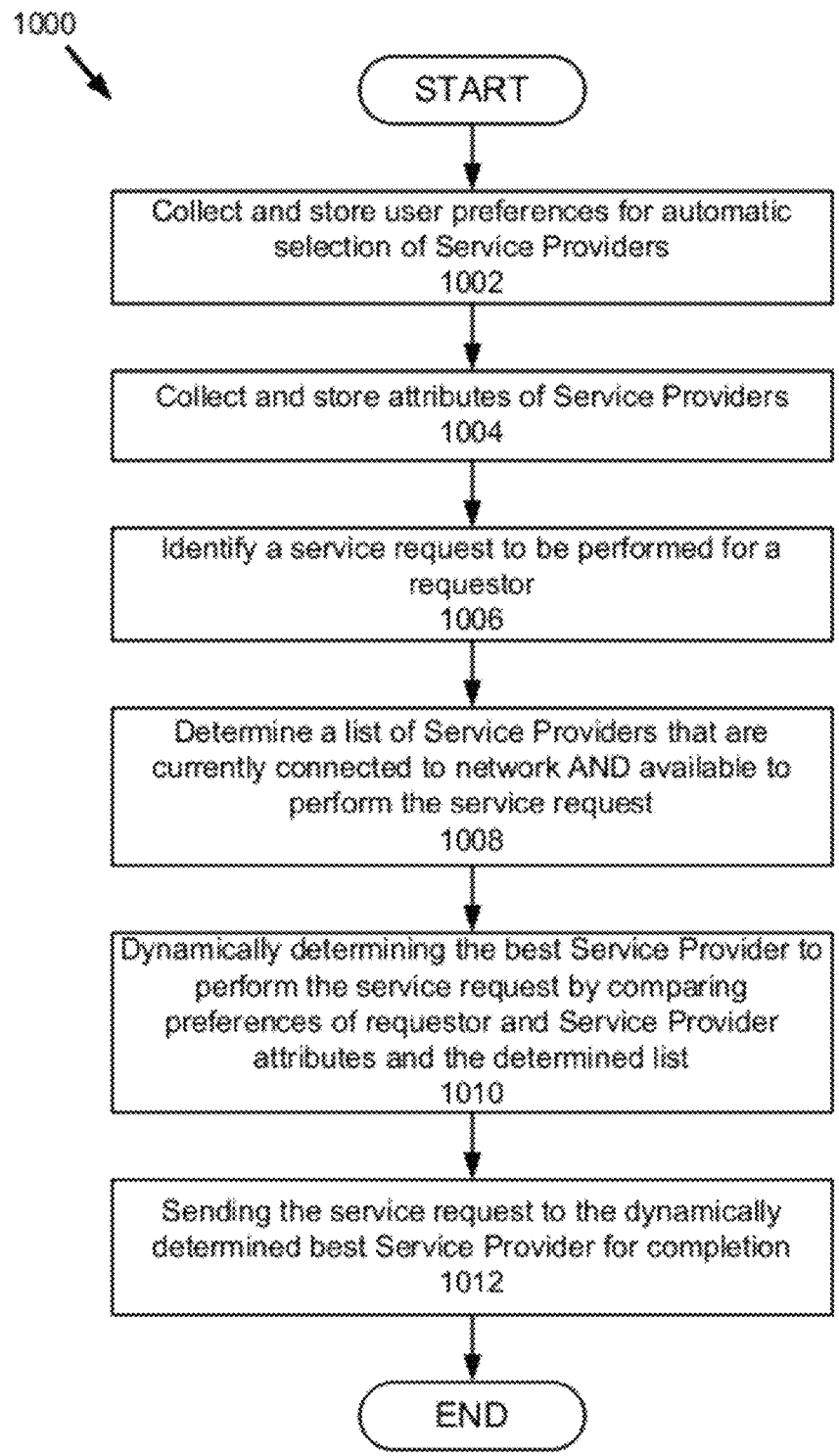
Figure 10 — Method for fully automatic selection of Service Provider

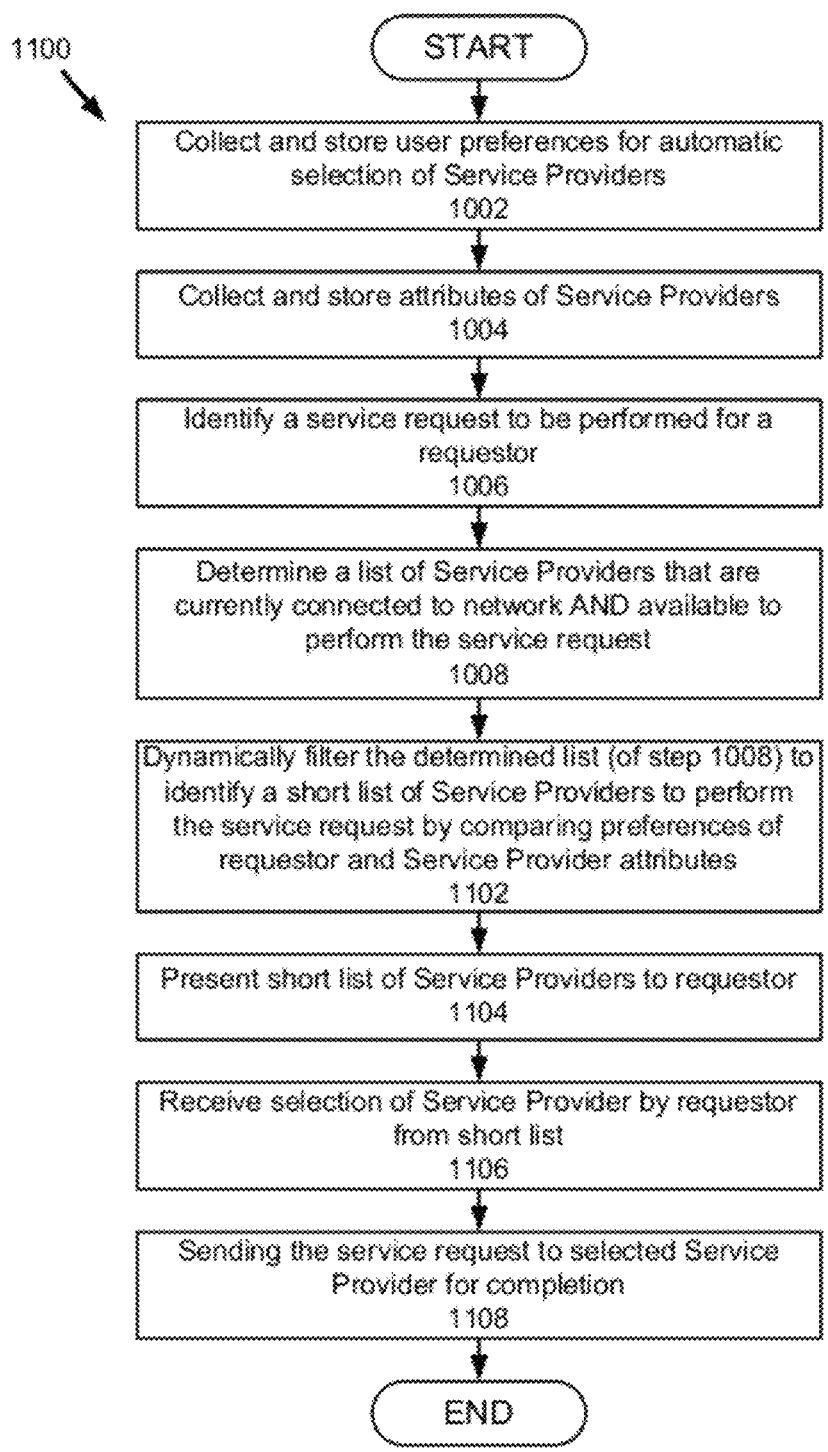
Figure 11 — Method for SEMI-automatic selection of Service provider

AUTOMATIC AND SEMI-AUTOMATIC SELECTION OF SERVICE OR PROCESSING PROVIDERS

BACKGROUND OF THE INVENTION

1. Field of the Invention

The present invention relates to portable computing devices and workflow processing of electronic documents, and in particular, the present invention relates to a system and method for automatic or semi-automatic selection of a processing provider.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

One particular problem with such prior art devices is that portable computing devices often have limited computational capabilities. In order to be able to perform a number of complex and more sophisticated tasks, the prior art has developed methods of coupling the portable computing devices to the "cloud" (network of interconnected service or processing providers). The coupling of the portable computing devices to the cloud allows the many complex calculations and other computationally intensive actions to be divided in a workflow that uses both the portable computing device and cloud. For example, a workflow is often divided between using the portable computing devices for receiving input and instructions and presenting data, while other parts of the system/cloud are used to manipulate electronic documents and perform other complex calculations.

This process of associating portable computing devices with service or processing providers can be complicated, cumbersome and difficult for the user of the portable computing device. The process is complicated by the creation of ecosystems in which various service providers or processing providers advertise or offer their services (often the same service) to the users of the portable computing devices. For example, an individual user may want optical character recognition (OCR) to be performed on an electronic document to make the text searchable. There are numerous service providers or processing providers that offer such services; however, they have various prizes, varying levels of quality, varying levels of responsiveness as well as a variety of other factors. It is often difficult for an individual user of the portable computing but device two select from the myriad of possible service providers or processing providers that are able to perform a particular function.

The process of selecting a service or processing provider is further complicated by a myriad of attributes or factors that are used to evaluate different service or processing providers. There can be tens of different factors that may be important to different users in selecting a service or processing provider. Furthermore, different factors are important to different users. The prior art in most instances provides very limited or no way to evaluate attributes of service or processing providers.

SUMMARY OF THE INVENTION

Embodiments of the present invention overcome the deficiencies and limitations of the prior art by providing a system and method for automatic or semi-automatic selection of service or processing providers. In particular, one embodiment of the present invention allows the user to input a set of preferences, and from that input automatically selects a service or processing provider that matches the attributes that are important a user as derived from the input preferences. In another embodiment of the present invention, the process is semi-automatic in that the user provides a set of preferences, and the present invention filters and the service or processing providers and presents a limited number of them that match the user's preferences and from which the user can select one for processing of the particular task.

One embodiment of the system comprises a service provider selection module includes: a user preference collector and graphic user interface (GUI), a user preference storage, a service provider availability detector, a service provider attribute collector, a service provider selection engine and a service provider attribute storage. The user preference collector and GUI are used to collect information about the user's preferences on service providers. The user preference collector captures the information from the user and stores it in the user preference storage. The service provider availability detector is used to determine whether and what service providers are currently available on the network. The service provider attribute collector collects information on the performance of different service providers. The collection of this information is a) in part automatic based on statistics and other data that are captured from the network' b) in part manual or solicited from users based upon performance of the service provider; and c) self provided from the service provider regarding certain criteria which he service provider may have such as different certifications. The service provider attribute storage is used to store data that is acquired by the service provider attribute collector. The service provider selection engine is coupled to the service provider attribute storage, the user preference storage and the service provider availability detector. Based upon and the user's preferences, provider availability and provider attributes, the service provider selection engine determines one or a list of best matches to provide a service based on the criteria that have been input by the user. In one embodiment, this is done automatically and the task is passed to the identified best service provider for processing. In another embodiment, this is done semi-automatically and a list of service providers that best match the users requirements are presented by the service provider selection engine and the task is passed to the provider selected by the user.

The present invention also includes a novel method for automatic selection of a service provider, semi automatic selection of the service provider, the method for inputting user preferences, and a method for collecting attributes about service providers.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 7 is a flow chart illustrating an embodiment of a method for displaying a graphical user interface (GUI) and collecting user preferences in accordance with the present invention.

FIG. 9 is a flow chart illustrating an embodiment of a method for collecting and storing service provider attributes in accordance with the present invention.

FIG. 10 is a flow chart illustrating an embodiment of a method for automatic selection of a service provider in accordance with the present invention.

FIG. 11 is a flow chart illustrating an embodiment of a method for semi-automatic selection of a service provider in accordance with the present invention.

DETAILED DESCRIPTION OF THE PREFERRED EMBODIMENTS

Figure 1:
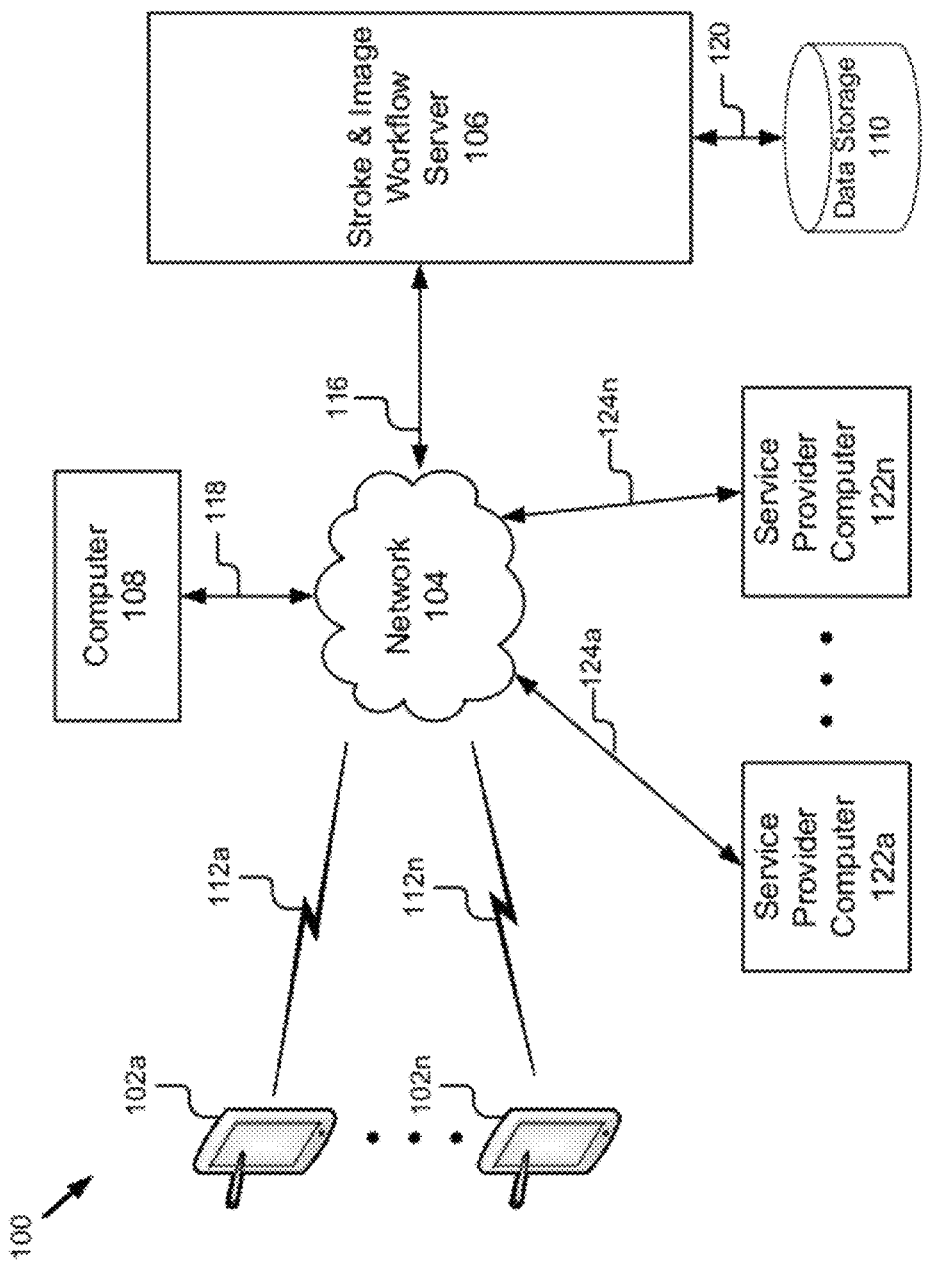
FIG. 1 is a block diagram of an embodiment of a system for automatic or semi-automatic selection of service or processing providers in accordance with the present invention.

A system for automatic or semi-automatic selection of service or processing providers is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform like the Amazon Kindle that utilize electronic paper, e-paper or electronic ink display. However, the present invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows an embodiment of a system 100 for automatic stroke and image based workflow. Referring now to FIG. 1, this embodiment of system 100 comprises: a plurality of portable computing devices 102a-102n, a network 104, a computer 108, a stroke and image workflow server 106, data storage 110, and one or more service provider computers 122a-122n.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices 102a-102n are adapted to receive images (e.g., forms or documents), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer or hardware server. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 430 (See FIG. 4) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 408, a workflow module 412, a logging module 416, and a verification module 430 (See FIG. 4). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. In an alternate embodiment, data storage 10 is coupled to the stroke and image workflow server 106 by the network 104. For example, in such an alternate embodiment, the data storage 110 is an online storage Web service such as Amazon S3. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

The service provider computers 122a-122n are conventional types such as personal computers or hardware servers. The service provider computers 122a-122n are coupled to the network 104 by signal lines 124a-124n, respectively. In one embodiment, the service provider computers 122a-122n access and communicate with the stroke and image workflow server 106 to perform a portion or task that is part of a larger workflow. In one embodiment, the service provider computers 122a-122n include a client application that interacts with the stroke and image workflow server 106 to receive documents as well as other information necessary to perform a task or portion of a workflow. The client application is also responsible for sending processed documents, other processed information or results back to the stroke and image workflow server 106. The client application also controls and handles communication between the service provider computers 122a-122n and the stroke and image workflow server 106 for control, error handling and other functions. For example, the client application may communicate with a verification module 430 (See FIG. 4) of the stroke and image workflow server 106 to verify the status or completion of processing of a particular form; or the service provider attribute collector 608 (See FIG. 6) for processing statistics related to performance of a particular job.

The service provider computers 122a-122n are configured to perform any of various functions such as but not limited to text-to-speech conversion, language conversion, format conversion, spell checking, formatting, OCR, proofreading, inputting to third party systems, image extraction, document storage and retention, etc. The service provider computers 122a-122n are configured operate on an electronic document as an intermediate stage of a workflow. In one embodiment, each of the service provider computers 122a-122n and is owned operated by a separate entity and each service provider computer 122a-122n provides a different type of functionality. Those skilled in the art will recognize that there may be multiple service provider computers 122a-122n providing the same service or functionality but with a variety of different attributes. In effect the service provider computers 122a-122n provide a marketplace in which providers compete for tasks or jobs that are allocated by the stroke and image workflow server 106. Finally, other embodiments, the service provider computers 122a-122n include some of the capabilities of the stroke and image workflow server 106, and communicate directly with portable computing devices 102a-102n. In many instances below, the term "service provider" is used interchangeably to refer to such service provider computer 122a-122n.

Although the system of FIG. 1 shows only one stroke and image workflow server 106, it should be understood that there could be any number of additional workflow servers, for example dedicated to other functions, companies, institutions, organizational structures. A computing pad 202 (See FIG. 2) may communicate with more than one stroke and image workflow server 106. Particular pages or sections of a document could be associated with different workflow servers. Also, portions of a compound document can be forwarded rather than sending the entire compound document.

Portable Computing Device 102

Figure 2A:
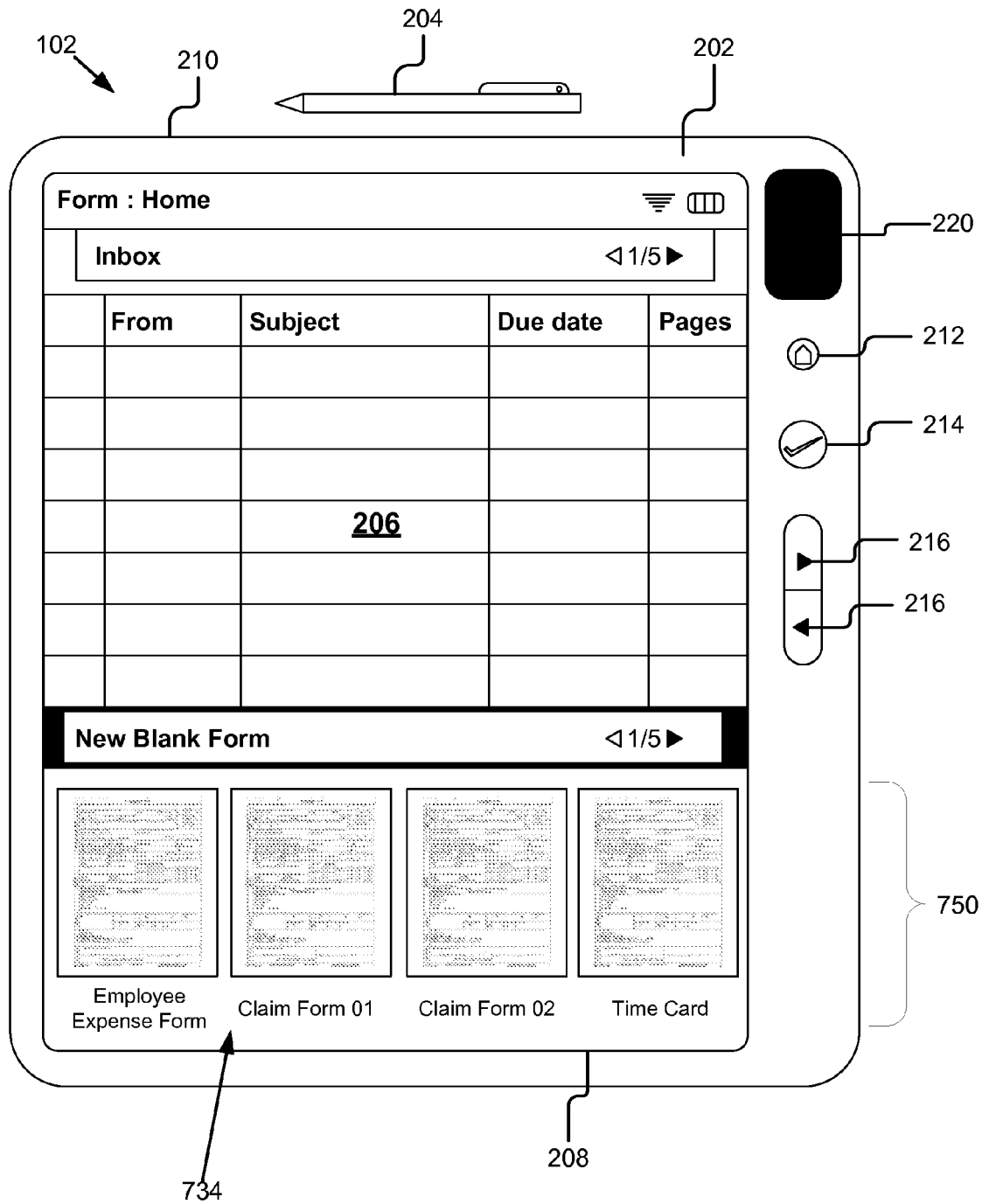
FIG. 2A is a front plan view of an embodiment of a portable computing device in accordance with the present invention.
Figure 2B:
FIG. 2B is a back plan view of the embodiment of a portable computing device of FIG. 2A in accordance with the present invention.
Figure 3:
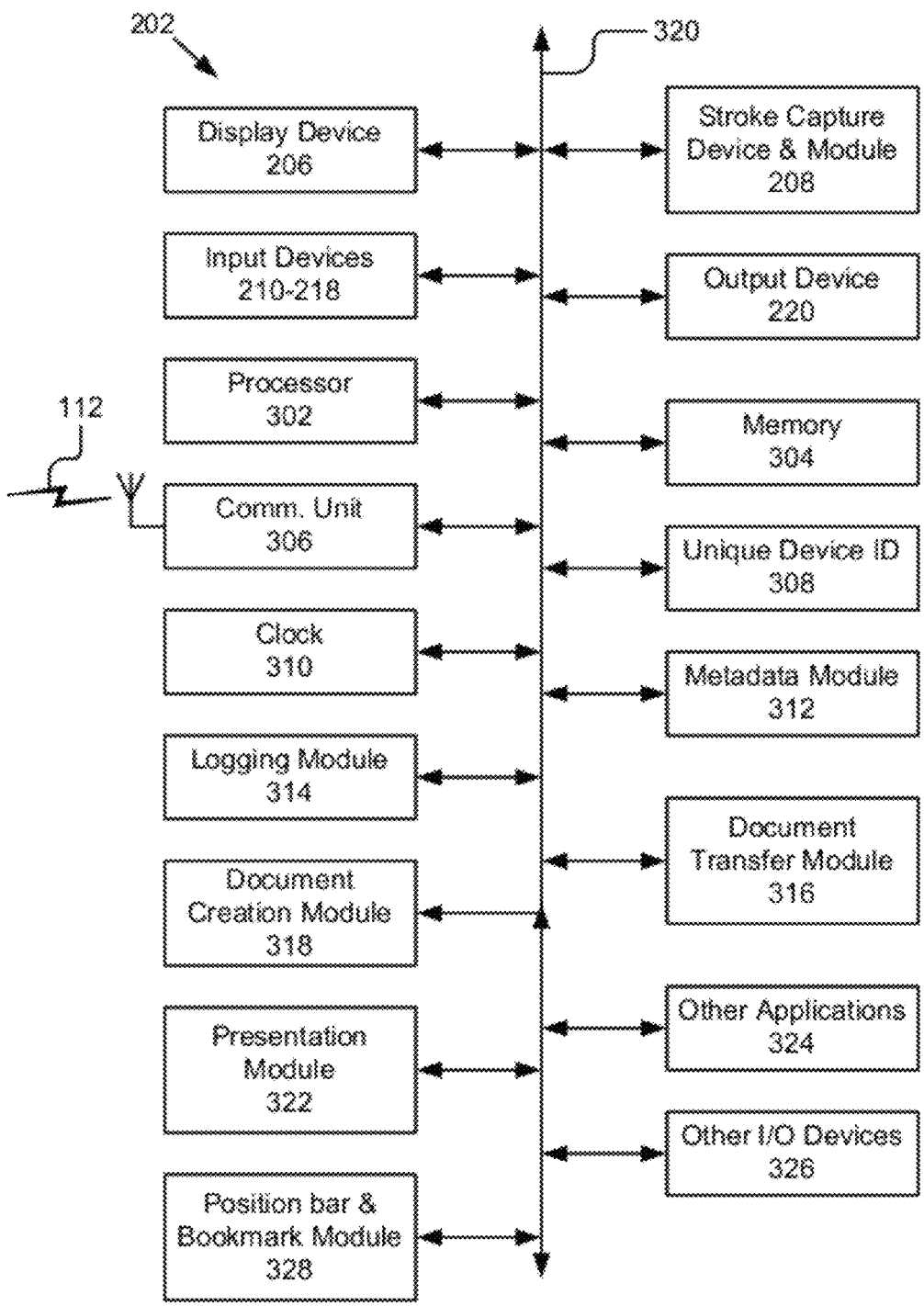
FIG. 3 is a block diagram of the embodiment of the portable computing device in accordance with the present invention.

Referring now to FIGS. 2A, 2B and 3, an embodiment of the portable computing device 102 will be described in more detail. The portable computing device 102 comprises a computing pad 202 and a stylus 204. The computing pad 202 displays an image and records any strokes written on the image. The strokes are typically displayed immediately on top of the image, just as if written by pen on paper. The strokes are also typically captured as a sequence of points or segments. Usually some timing information is captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes.

The computing pad 202 comprises a display device 206, a stroke capture device and module 208, a plurality of input devices 210-216, a camera 218, an output device 220, a processor 302, a memory 304, a communication unit 306, unique device identifier storage 308, a clock 310, a metadata module 312, a logging module 314, a document transfer module 316, a document creation module 318, a bus 320, a presentation module 322, other applications 324, and an position bar and bookmark module 328.

Referring now to FIGS. 2A and 2B, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or an electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. The stroke capture device 208 is either part of or adapted to communicate with the stroke capture module 208.

In addition to the stylus 204, the computing pad 202 provides a plurality of input devices 210-216 to input commands. As shown in FIG. 2A, a first button 210 on the top edge of the computing pad 202 when selected turns the computing pad 202 on and off. In one embodiment, the first button 210 can be selected for a short duration to put the computing pad 20 in sleep mode, and depressed for a longer duration to turn the computing pad 202 off. A second button 212 controls the operation of the camera 218 and when selected causes the camera 218 to capture an image. A third button 214 when selected indicates that annotation of a document is complete and the document should be sent by the computing pad 202. A fourth pair of input buttons 216 allows the user to transition to a next page or previous page, respectively, of a document. Those skilled the art will recognize that these input devices as buttons are merely one embodiment for the plurality of input devices 210-216 and that various other configurations of fewer or more buttons or input devices are within the spirit and scope of the present invention. More specifically, in another embodiment, the computing pad 202 has very two (or no) buttons because buttons may interfere with the device being perceived as paper-like.

In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 1 button for power and one button for submit; a second example has a slider to choose a page among a large number of pages depending on the position of the finger and one or more buttons.

Referring now also to FIG. 2B, the back side of the computing pad 202 is shown. The computing pad 202 includes the camera 218 on the back side and an output device 220 on the front side. As shown in FIG. 2B, the camera 218 is positioned with its lens facing outward on the back side of the computing pad 202 in the upper left-hand corner. The camera 218 is a conventional type such as those available on cell phones or notebook computers. The output device 220 is on the front side of the computing pad 202 and shown in FIG. 2A. The output device 220 is a device for displaying small images and is used as the camera's viewfinder. In one embodiment, the output device 220 is an organic light emitting diode (OLED) and is only operational when the camera is operational. In another embodiment, the output device 220 is used to indicate the status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now also to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a document and storing metadata as part of a document. In one embodiment, the metadata module 312 is instructions executable by the processor 302 to provide the functionality described below for accessing both image/page metadata as well as document metadata. In another embodiment, the metadata module 312 soft routines for presenting the user interfaces, capturing stroke information, and routing (sending documents from and receiving at the portable computing device 102) documents according to the workflow. In one embodiment, the metadata module 312 is stored in the memory 304 and is accessible and executable by the processor 302. In any event, the metadata module 312 is adapted for cooperation and communication with the processor 302 and other components of the computing pad 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled hash-chained log at the computing pad 202 and the stroke and image workflow server 106. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving documents from the stroke and image workflow server 106. In other embodiments, the document transfer module 316 sends and receives documents as formatted messages from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the document or formatted message from the computing pad 202 such as by email, file transfer, XMPP or special purpose application.

In a first embodiment, the document transfer module 316 is client software operational on the computing pad 202 that maintains a directory structure that serves as an inbox. The document transfer module 316 moves documents from a corresponding inbox on the stroke and image workflow server 106 to this directory. Once a document in the inbox of the computing pad 202 has been annotated and the user inputs the submit instruction, the document transfer module 316 removes the document from the directory structure and transfers it to the stroke and image workflow server 106 for further processing.

In a second embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 is configured to use either. The messages are in a format the computing pad 202 can directly use, e.g. an attachment of image files. The messages are in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102*a-n* may be configured as clients with the same IMAP server and 'username.' The group of devices 102*a-n* might display all forms in the "inbox." Once any user on any device 102*a-n* marks the form as 'processed' the device moves the message out of the 'inbox' and perhaps into a 'processed' box on the IMAP server. When the other devices 102*a-n* check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a third embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a fourth embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this allows a service to transmit an image for the pad at the same time as strokes are being transmitted from the pad to server. Instant messaging protocols can also be useful if a group of computing pads 202 is sharing a display space and thus all members of the group may be informed of new strokes.

In a fifth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file.

The document creation module 318 is software or routines for creating new documents. The document creation module 318 is operable on the processor 302 and is coupled to the bus 320 for communicating with the other components of the computing pad 202. The document creation module 318 is responsive to signals from the input devices 210-218 or the stroke capture device 208. The document creation module 318 stores template forms of documents in the memory 304. In response to user input, the document creation module 318 accesses the stored template forms and copies the selected one to create a new document from the template form. Once created, the document stored in memory 304, is added to the inbox list maintained by the presentation module 322, and is otherwise editable, manipulatable and transmittable just like any other document.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the presentation module 322 and the other applications 324. There may also be a plurality of busses in computing system 202, designed to provide the most efficient communications between functional elements.

The presentation module 322 is software and routines for displaying documents and the inbox on the display device 206, and adjusting the display of the image responsive to input from input devices 210-216. The presentation module 322 performs routines that generate the dual mode user interface shown in FIGS. 2, 8A and 8B. The presentation module 322 also cooperates with the position bar and bookmark module 328 to generate a novel graphical user interface. In one embodiment, the presentation module 322 is a thin client routine executable by the processor 302 to cause display of the image on the display device 206. The presentation module 322 is coupled by the bus 320 to the display device 206, the processor 302, the memory 304, and the position bar and bookmark module 328.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

The position bar and bookmark module 328 is software and routines for generating a novel graphical user interface that provides a position bar for navigating between pages of a document and providing a book marking functionality. The position bar and bookmark module 328 is responsible for generating a graphical user interface that provides the position bar having a manipulatable page box for moving between pages in a document. The position bar and bookmark module 328 is adapted to receive pen input from the stroke capture module 208 and interprets the pen input as instructions or commands. By manipulation of the location of the page box along the position bar, the user can change the page being displayed. In one embodiment, the position bar and bookmark module 328 also provides a bookmarking or referencing function. The position bar and bookmark module 328 is responsive to pen inputs to add, move to, or delete a reference mark along the position bar. Once the reference mark is set, the position bar and bookmark module 328 interprets input near the reference marks or bookmarks as a command to move to the marked position.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O devices 326 to facilitate power systems control, as well as off-load the main processor 302 from lower-speed lesser-important tasks.

Stroke and Image Workflow Server 106

Figure 4:
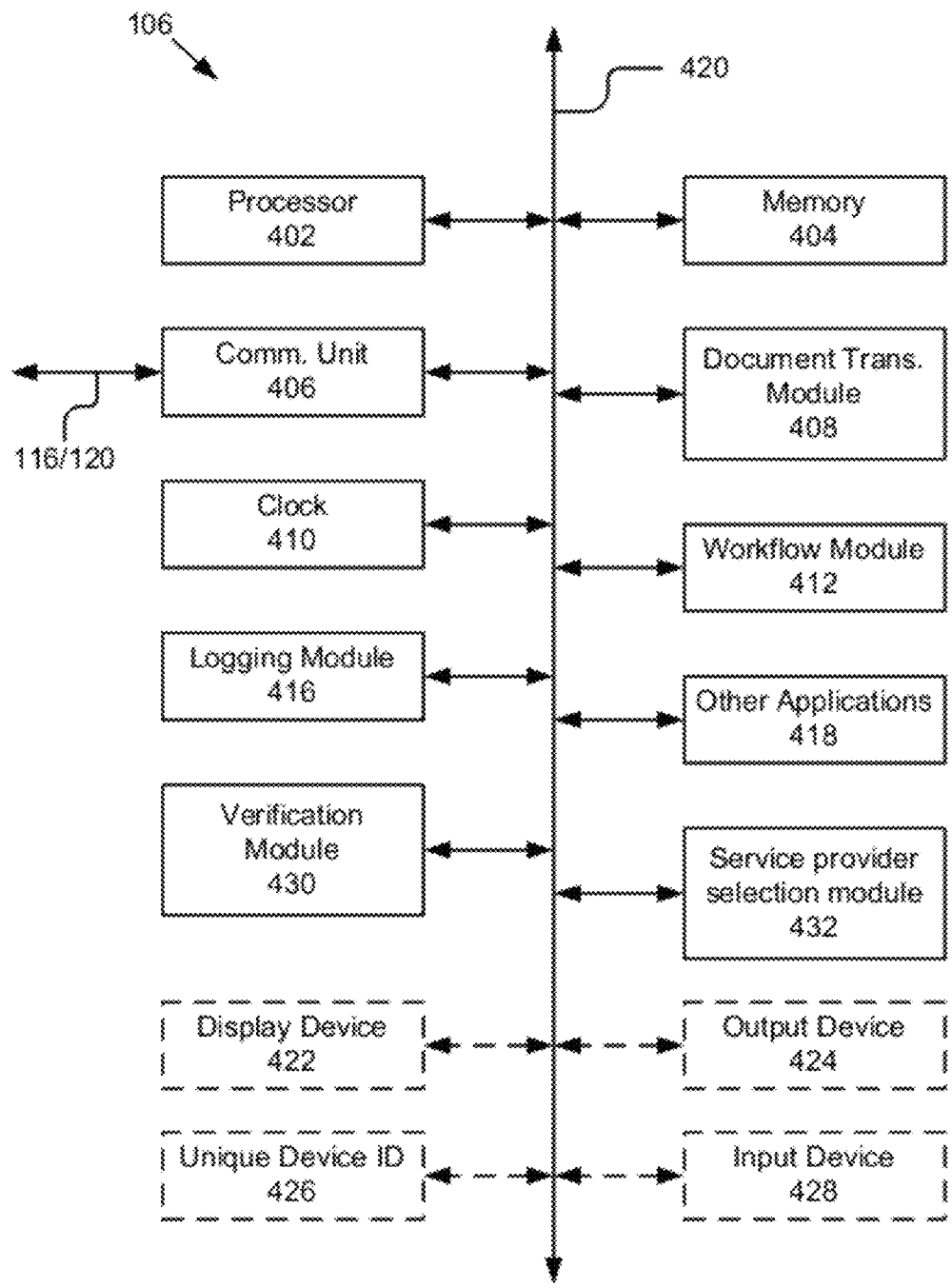
FIG. 4 is a block diagram of an embodiment of the stroke and image workflow server in accordance with the present invention.

Referring now to FIG. 4, an embodiment of a stroke and image workflow server 106 will be described in more detail. The stroke and image workflow server 106 comprises a processor 402, a memory 404, a communication unit 406, a document transfer module 408, a clock 410, a workflow module 412, a logging module 416, other applications 418, a bus 420, a verification module 430 and a service provider selection module 432. In an alternate embodiment, the stroke and image workflow server 106 further comprises a display device 422, an output device 424, unique device ID storage 426 and an input device 428.

Those skilled in the art will recognize that some of the components of the stroke and image workflow server 106 have the same or similar functionality to the components of the computing pad 202 so descriptions of these components will not be repeated here. For example, the processor 402, the memory, 404, the communication unit 406, the document transfer module 408, the logging module 416, the clock 410, the other applications 418, display device 422, output device 424, unique device ID 426 and input device 428 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 406 may couple the stroke and image workflow server 106 to the network 104 in a wired manner instead of wirelessly. The processor 402 is more computationally powerful than the processor 302 as the workflow server 106 likely services numerous portable computing devices 102. The document transfer module 408 is an e-mail server as opposed to an e-mail client. The display device 422 may be a CRT, and the output device 424 is speakers. The input device 428 includes a keyboard and mouse type controller. Those skilled in the art will recognize that there may be a variety of other differences as the components of the stroke and image workflow server 106 acts as a hardware server as opposed to a remote client.

The verification module 430 of the stroke and image workflow server 106 is software and routines for verifying the processing of a document. In one embodiment, the verification module 430 is routines executable by the processor 402 to perform verification of document processing as described below. The verification module 430 is coupled by bus 420 to the processor 402, the memory 404 and the communication unit 406. Note that the verification module 430 might be used independently of the stroke and image workflow server 106. In fact, it might run on the computer 108 for independent verification of documents without need to trust a particular server.

The workflow module 412 of the stroke and image workflow server 106 is software and routines for processing and routing documents or formatted messages. The workflow module 412 creates documents 400 or creates formatted messages. The workflow module 412 also works with the logging module 416 to create a system log (stored in the logging module 416, the memory 404 or the data storage 110) and publishes or makes available that log as needed. The workflow module 412 is also responsible for routing the document or formatted messages on to the next location as part of a processing workflow. In one embodiment, the computing pad 202 returns documents by submitting them or sends reply emails including attachments to the stroke and image workflow server 106, and the workflow module 412 determines the routing and next workflow step. It should be noted that the process of creating a system log by the workflow module 412 can create a entangled log, and that the presences of multiple workflow modules 412 servicing distinct pages of the document greatly increases the difficulty of tampering with the document without being detected.

For convenience and ease of understanding, the forwarding of documents and the processing of documents within the workflow is described below as being performed by the workflow module 412 of the stroke and image workflow server 106; however, those skilled in the art will recognize that alternatively the same operations may be performed by the computing pad 202.

Those skilled in the art will recognize that there are a variety of ways that the workflow module 412 of the stroke and image workflow server 106 determines what to do with the document once it has been received from the computing pad 202 (submitted by the computing pad 202). In one embodiment, computing pads 202 are configured to work with a particular stroke and image workflow server 106 and submit a page to the stroke and image workflow server 106; for that page, the stroke and image workflow server 106 then determines the next step based on preprogrammed rules.

In another embodiment, workflows are specified in the document or in the email (formatted message) in which the document was sent. In the simple case of receiving a document by email, the computing pad 202 returns the completed document to the stroke and image workflow server 106. The stroke and image workflow server 106 then extracts the metadata from the completed document, determines the next step in the workflow, and then sends the completed document to the device (e.g., computer 108) identified to perform the next step in the workflow. In an alternate embodiment, the computing pad 202 returns the completed document by e-mail to the stroke and image workflow server 106, and the e-mail includes the workflow. The stroke and image workflow server 106 determines the next e-mail address in which to send the completed document from the e-mail that included the completed document. In an alternate embodiment, HTTP headers could be used instead of or in addition to e-mail headers. If the documents are being transported in a manner that supports page images, strokes, and metadata, then the metadata can contain the workflow instructions and status. Again, in the simple case, the metadata includes a list of email address and the current step of the workflow.

In one embodiment, the workflow is very predefined and specifies which service provider (e.g., which service provider computer 122a-122n) should be used to perform each specific job, step, or task in the workflow.

However, in another embodiment, the workflow module 412 cooperates with the service provider selection module 432 to automatically or semi-automatically determine which service provider should be used to perform a job, step or task in a workflow. The service provider selection module 432 is coupled to the bus 420 for communication with the other components of the stroke and image workflow server 106. The service provider selection module 432 is also coupled by the bus 420 to the network 104, and thus, the service provider computers 122a-122n and the portable computing devices 102a-102n. The service provider selection module 432 interfaces with the user via the portal computing devices 102a-102n to collect the user preferences such as the level of automatic selection (e.g., automatic, semi-automatic or manual) and the attributes of a service provider that are most important to that user. The service provider selection module 432 collects and stores this information and uses it to determine which service providers should be used for performing tasks, job or portions of a workflow associated with that user. The service provider selection module 432 also monitors the service providers on the network 104 to determine which ones are available and ready to provide services. The service provider selection module 432 and its constituent components are described in more detail below with reference to FIG. 6.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the computing pad 202 support a wide range of document formats. Providing pure images, i.e. not files requiring rendering, to the computing pad 202 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. Those skilled in the art will recognize that the document directories can be transferred and stored as standard ZIP format archives.

Multiple page image files which share the same initial name segment are considered to be alternate representations of the file, of equivalent quality, and the presentation module 322 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method.

A metadata directory may itself contain subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "document.d". This directory is included at the top level directory. It is useful to store a log of actions associated with a document in the document metadata. In one embodiment, the system 100 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Automatic Document Processing

Figure 5:
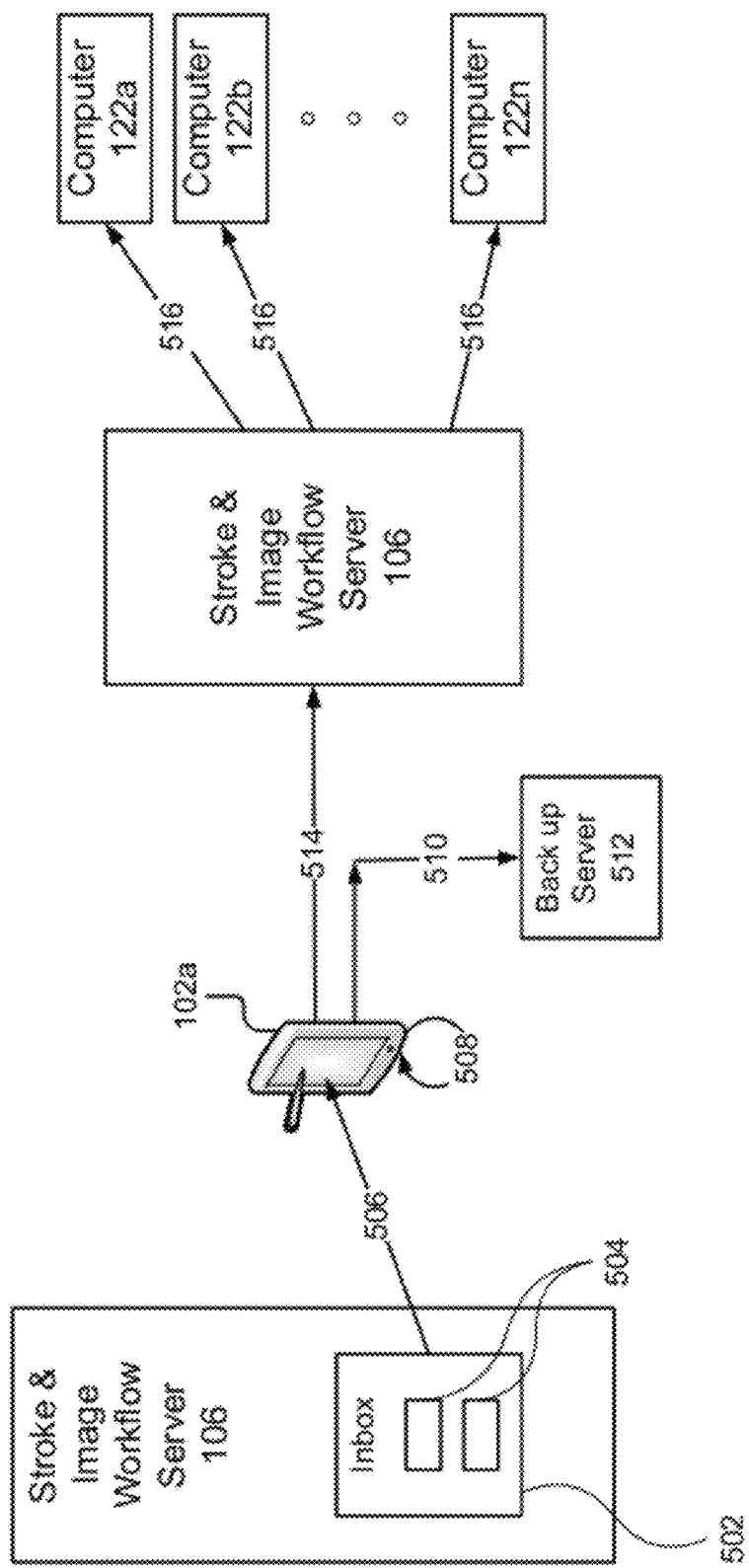
FIG. 5 is a schematic flow diagram illustrating the automatic document processing in accordance with the present invention.

FIG. 5 shows one embodiment of an automatic document processing method in accordance with the present invention. The process begins with the stroke and image workflow server 106 creating and establishing an inbox 502 associated with a portable computing device 102*a*. The stroke and image workflow server 106 then creates and places one or more documents 504 in the inbox 502 that are scheduled for delivery to the portable computing device 102*a*. For example, the documents may be forms that the user of the portable computing device 102*a* needs to complete and return such as a medical information form. The stroke and image workflow server 106 automatically transfers 506 the documents 504 from the inbox 502 to a corresponding inbox (not shown) on the portable computing device 102*a*. Depending on the embodiment, the transfer of documents may occur at a number of different times: 1) once the documents 504 are placed in the inbox 502; 2) once the portable computing device 102*a* is coupled for communication with the stroke and image workflow server 106; 3) at periodic times, such as 15 minute intervals; or 4) various combinations of the above. Once the documents 504 have been transferred 506 to the portable computing device 102*a*, the portable computing device 102*a* is used to annotate the documents 504 and add strokes and other information to them. The annotations are added to the document 504 and the document 504 is stored back on the portable computing device 102*a* as depicted by line 508. In one embodiment, the information and the annotations added to documents 504 are backed up 510 off of the portable computing device 102*a* to a backup server 512. This transfer of documents can occur at times similar to those described above. Those skilled in the art will recognize that this step of backing up annotations made with the portable computing device 102*a* may be performed at regular intervals such as every 10 minutes or longer to preserve power of the portable computing device 102*a*. In yet another embodiment, the backup interval can be set by the user. Once the user has completed adding annotations to a particular document 504 and the document 504 is ready for submission, the user inputs a submit instruction and the annotated document 504 is transferred 514 from the portable computing device 102*a* to the stroke and image workflow server 106. Once the annotated document 504 is received at the stroke and image workflow server 106, it is stored, logged and the next step in the workflow process is determined. Based on the determination of where the document 504 should be sent to next, the stroke and image workflow server 106 transmits 516 the document to the determined device (e.g., the service provider computers 122*a*-122*n*). While FIG. 5 illustrates the plurality of computers as being service provider computers 122*a*-122*n*, those skilled in the art will recognize that service provider computers 122*a*-122*n* represent a variety of different vendors capable of performing additional processing or annotation to the document 504.

The present invention is particularly advantageous because of the level to which it automatically processes forms or documents and advances them in a workflow. FIG. 5 described above illustrates how the present invention is automatic in that forms or documents are automatically advanced in the workflow and sent from the stroke and image workflow server 106 to the portable computing devices 102*a-n*. Once the forms or documents have been annotated by the user, they are sent back to the stroke and image workflow server 106 with the user merely having to input a single "submit" command or instruction. This automatic level processing of forms or documents is particularly advantageous because it makes the portable computing devices 102*a* easy and simple enough to use for every day document processing. Moreover, the present invention lends itself to providing the user with an experience or interaction that very closely mimics the use of pencil and paper, thereby requiring little or no learning curve.

In particular, the present invention includes user interfaces that provide two modes of interaction with the computing pad 202. In a first mode (inbox mode), a user interface presents an inbox that lists all the documents that are editable annotatable by the user. In this first mode, the user is limited to three actions: 1) re-sort the order in which the documents are listed; 2) select a document for editing; 3) create a new document for editing. In a second mode (document annotation mode), a user interface is presented that displays an image of a document. Again, the user is limited to three actions: 1) add stroke and occasions to the document; 2) add a picture to the document; 3) transition to displaying a different page of the image or transitioning back to the inbox mode. The present invention is particularly advantageous because it limits the number of decisions required by the user. By providing only two interfaces in which to interact with documents and constraining the number of actions that may be taken in each mode, the user interface is elegantly simple and efficient. This allows the user interfaces to be adopted easily with little or no learning curve, providing a user experience that mimics the interaction with paper, and integrating the collection of collection of information with automatic processing within a workflow. Furthermore, the present invention provides a single command workflow routing.

Service Provider Selection module 432

Figure 6:
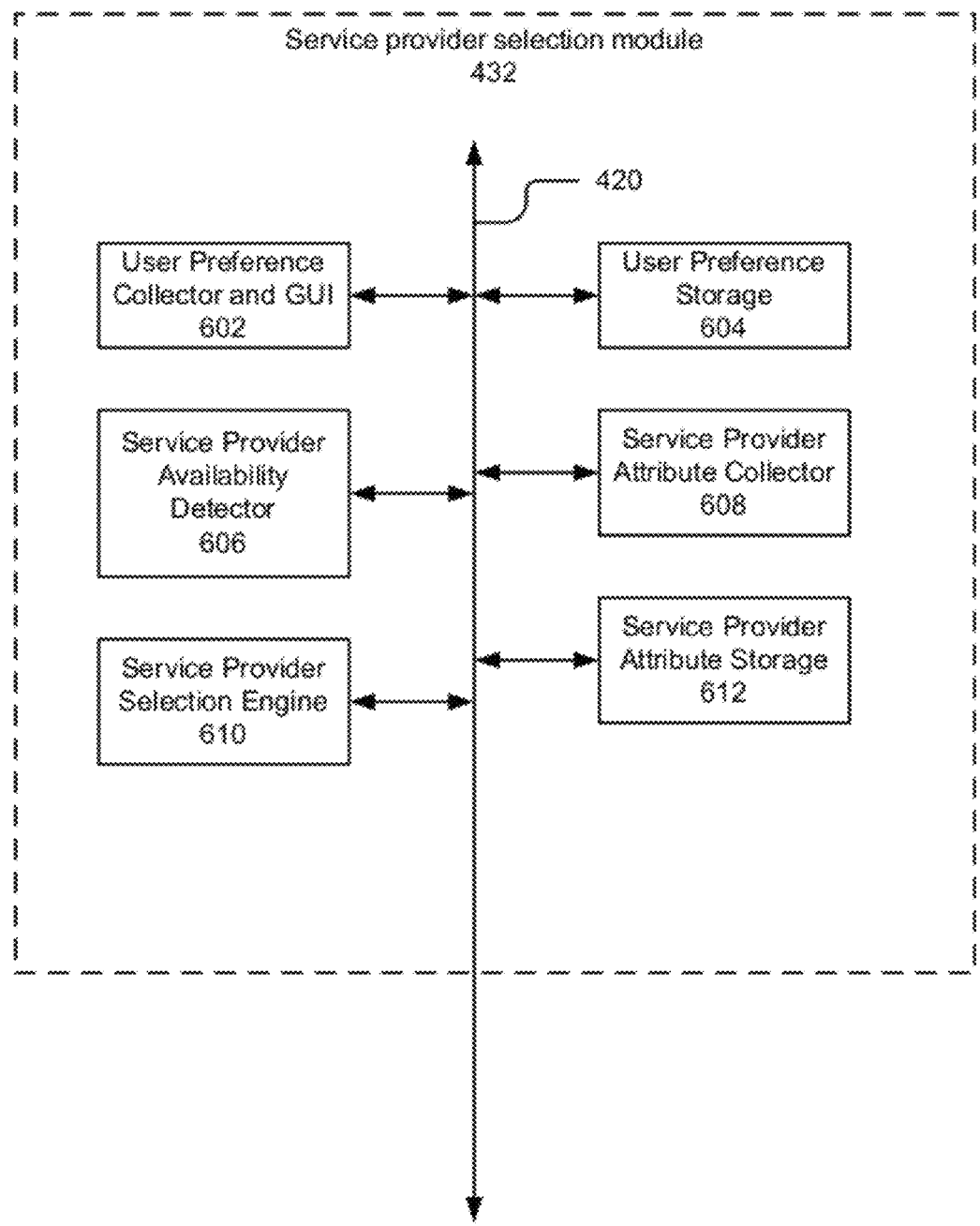
FIG. 6 is a block diagram of an embodiment of a service provider selection module in accordance with the present invention.

Referring now to FIG. 6, one embodiment for the service provider selection module 432 will be described. This embodiment of the service provider selection module 432 comprises: a user preference collector and graphic user interface (GUI) 602, a user preference storage 604, a service provider availability detector 606, a service provider attribute collector 608, a service provider selection engine 610 and a service provider attribute storage 612. These components are coupled to the bus 420 for communication with each other and communication with the stroke and image workflow server 106 and the portable computing devices 102a-102n as will be further defined below. Those skilled in the art will recognize that in other embodiments these components 602, 604, 606, 608, 610 and 612 can be coupled directly to the other components as required by the functional description of each component 602, 604, 606, 608, 610 and 612 and its communication needs that follows.

Figures 8A, 8B:
FIGS. 8A and 8B are a graphic representation of one embodiment of the user interface for level of automatic selection and provider attribute selection in accordance with the present invention.

The user preference collector and graphic user interface (GUI) 602 is software and routines for presenting a GUI to the user and to collect user preference information. For example, the user preference collector in GUI 602 is routines executable by a processor (e.g., a processor 402). In another embodiment, the user preference collector and GUI 602 is the hardware module specifically constructed to perform the operations described herein. The user preference collector and GUI 602 collects information about the user's preferences for automatic service provider selection and information about which attributes of the service providers are most important to the user. The user preference collector and GUI 602 also generates a novel graphic user interface that allows the user to input this information using the portable computing device 102a in a simple and easy manner. Example user interfaces are shown in FIGS. 8A and 8B, and will be described in more detail below. In one embodiment, the user preference collector and GUI 602 is configured for communication with the presentation module 322 of the computing pad 202 to send information necessary to generate the novel GUI, and to receive information input by the user on the computing pad 202. The user preference collector and GUI 602 is also configure for communication with the user preference storage 604 to store information received about the user's preferences from the computing pad 202 in the user preference storage 604. The function, operation and structure of the user preference collector and GUI 602 will be described in more detail below with reference to the method described in conjunction with FIG. 7.

The user preference storage 604 is a memory of a conventional type for storing the user's preferences and other information. In one embodiment, the user preference stored 604 is volatile memory, and in another embodiment the user preference storage 604 is nonvolatile memory such as flash memory or a hard disk. In yet another embodiment, the user preference storage 604 includes the communication and functional capability to back up the user information as to another hardware server or network storage for redundancy and ease of access for other users. In one embodiment, the user preference storage 604 includes a database for storing information about multiple users and their preferences in an ordered fashion so that information can be easily quickly accessed. The user preference storage 604 is coupled to the user preference collector and GUI 602 to receive new or modified information from the user about their preferences. The user preference storage 604 is also coupled to the service provider selection engine 610 so that the service provider selection engine 610 can access the user's information in making a determination of which service providers to recommend or use for a particular task or job of a workflow.

The service provider availability detector 606 is software and routines for monitoring the network 104 to determine which service provider computers 122 are accessible and available for performing tasks or jobs of the workflow. For example, the service provider availability detector 606 is routines executable by a processor (e.g., a processor 402). In another embodiment, the service provider availability detector 606 is the hardware module specifically constructed to perform the operations described herein. The service provider availability detector 606 is coupled to the network 104 by bus 420. The service provider availability detector 606 via the network 104 is able to determine what service providers are available, accessible and operational to perform task or jobs of a workflow. In one embodiment, the service provider availability detector 606 provides a real-time analysis of what service providers are accessible via the network 104 and operational to perform tasks or services. The service provider availability detector 606 is configured for communication with the service provider computers 122a-n via the network 104, the service provider selection engine 610 to indicate which service provider are currently available, and the other components of the stroke and image workflow server 106.

In one embodiment, the service provider availability detector 606 actively searches or crawls the network 104 to identify service providers. One a new or previously unavailable service provider is identified, the service provider availability detector 606 sends an availability query to any service provider computers 122 to determine their status. In another embodiment, the service provider availability detector 606 maintains a list of all service providers that are ever available on the network 104, and periodically sends a signal to confirm that the service providers are currently available and operational. The service provider availability detector 606 maintains a list of service provider computers 122 that are available based on the responses that are received to the availability queries it sends. In one embodiment, the list of available service providers is maintained in real time. In other embodiments, the list of available service providers has a latency of 5 to 10 minutes.

In another embodiment, the service provider availability detector 606 maintains a registration list, and any service provider that is interested in receiving jobs from the stroke and image workflow server 106 is required to register with the service provider availability detector 606. Any service provider that wishes to become registered with the service provider availability detector 606 sends a registration request to the service provider availability detector 606. The service provider availability detector 606 confirms that the service provider is accessible using the network 104 such as by sending message that generate specific responses, and then sends a confirmation message to the service provider indicating that it has been registered. The service provider availability detector 606 then adds the confirmed service provider to the list of registered service providers. Those skilled in the art will recognize that there are other methods for the service provider availability detector 606 to determine which service providers are accessible and operational. For example, a polling scheme may be used to determine a current status of service providers. Alternatively, the service providers may be required to issue a heartbeat signal to the service provider availability detector 606 at a predetermined time to maintain their status is operational. Further, the above methods may be combined in a variety of ways by the service provider availability detector 606.

The service provider attribute collector 608 is software and routines for monitoring the performance of the service provider computers 122a-120n in completing tasks or jobs the workflow. For example, the service provider attribute collector 608 is routines executable by a processor (e.g., a processor 402). In another embodiment, the service provider attribute collector 608 is a hardware module specifically constructed to perform the operations described herein. The operation of the service provider attribute collector 608 is described in more detail below with reference to the method of FIG. 9. The service provider attribute collector 608 collects a variety of information about the service provider from various different sources. For example, the service provider attribute collector 608 collects information on the performance of different service providers. The collection of this information is a) in part automatic based on statistics and other data that are captured from the network 104; b) in part manual or solicited from users based upon performance of the service provider; and c) self provided from the service provider regarding certain criteria which the service provider may have such as different certifications. An example list of attributes collected by the service provider attribute collector 608 is shown below in Table 1.

TABLE 1

| Attribute | Description |
| --- | --- |
| Cost | Cost for performing the task or job |
| Bandwidth | The capacity of the service provider to handle jobs or tasks and the size of those jobs or tasks |
| Quality of service | The quality or accuracy of the results produced by performance of the task or job |
| Customer feedback | Ratings by users of the service on a predefined scale |
| Speed or service throughput | How long it will take for the task or job to be completed |
| Availability | Hours of operation or times when the service is operational |
| HIPPA or other standard compliance | Whether the process end to end is HIPPA compliant |
| Certifications | Whether the service provider is certified by a third-party rating agency |
| Authorized | Whether the service provider is authorized by an original equipment manufacturer to perform the task or job |
| Green | Whether the services are provided in an environmentally friendly way (e.g., Leed certified and what level) |
| Professionalism | Whether the service provider act in a professional manner and delivery of services |
| Timeliness | Whether the service provider delivered the work product before the set deadline |
| Expertise | Whether the service provider had the requisite expertise to perform the job or task |
| Carbon footprint | The carbon foot print for the service provider performing the task or job |
| Fair Trade | Whether the service provider employs fair trade practice in dealing with its employees and vendors |
| Automation level | Percentage of job or task that will be performed automatically by a machine as opposed to use of human beings to perform part of the process |
| Compliance With Security Standards | Whether service meets requirements of standard like FIPS or other device security |
| Rejection Rate | Ration of documents rejected by a customer or complained about by a customer to total documents processed |

In one embodiment, the service provider attribute collector 608 is distributed over the system 100 and includes an aggregation and storage portion that is operable in the service provider selection module 432 of the stroke and image workflow server 106. In this embodiment, the service provider attribute collector 608 also includes thin client collector applications that are operable at various locations in the system such as at the portable computing device 102, the service provider computers 122 or the backup server 512 to collect information about the processing of documents by the service provider computers 122 and send that information to the aggregation and storage portion at the service provider selection module 432. The service provider attribute collector 608 is coupled to the service provider computers 122, the portable computing devices 102 and the service provider attribute storage 612. The service provider attribute collector 608 receives information about the performance of the service providers from the service provider computers 122, the portable computing devices 102 and optionally the backup server 512. The service provider attribute collector 608 stores this information in the service provider attribute storage 612 for use by the service provider selection engine 610.

In one embodiment, the service provider attribute collector 608 also checks the information received from the portable computing devices 102 and the service provider computers 122 for consistency. For example, if the information is consistent, the information is sent to and stored in the service provider attribute storage 612. However, if the information is not consistent then the service provider attribute collector performs one of various analysis steps to determine which data is accurate. For example, the service provider attribute collector 608 can: 1) discard the data; 2) initiated arbitration process in which the service provider Ashley collector 608 attempt to determine which data source is accurate; 3) by default accept data from the portable computing device 102 over data from the service provider; 4) accessed the verification module 430 to determine which data source is accurate; etc. In an alternate embodiment, the service provider attribute collector 608 does not require a client collector application, and instead accesses the logs of the portable computing devices 102, the stroke and image workflow server 106 and the service provider computers 122. Using the information stored in the logs, the service provider actually collector 608 can collect a number of statistics about the performance of the service providers.

Those skilled in the art will understand that the service provider attribute collector 608 also includes software and routines to present surveys to the user and to collect user feedback via the portable computing device 102. Similarly, the service provider attribute collector 608 also includes software and routines to present surveys, tables and other forms to the service provider computers 122 for completion by the service providers. Thus, the service provider attribute collector 608 is able to collect and aggregate information from three sources: 1) information independently collected and verified via the activities performed and the document sent and received on the network 104; 2) information provided by the users by the portable computing devices 102; and 3) information provided by the service provider computers 122.

The service provider attribute storage 612 is a memory of a conventional type for storing the service provider attributes and other information. In one embodiment, the service provider attribute storage 612 is volatile memory, and in another embodiment the service provider attribute storage 612 is non-volatile memory such as flash memory or a hard disk. In yet another embodiment, the service provider attribute storage 612 includes the communication and functional capability to back up the service provider attribute information as to another hardware server or network storage for redundancy and ease of access for other users. In one embodiment, the service provider attribute storage 612 includes a database for storing information about different service providers in an ordered fashion so that information can be easily quickly accessed. The service provider attribute storage 612 is coupled to the service provider attribute collector 608 to receive new or modified attribute information. The service provider attribute storage 612 is also coupled to the service provider selection engine 610 so that the service provider selection engine 610 can access the service provider attribute information making a determination of which service providers to recommend or use for a particular task or job of a workflow.

The service provider selection engine 610 is software and routines for selecting a service provider to perform a job or task of a workflow. For example, the service provider selection engine 610 is routines executable by a processor (e.g., a processor 402). In another embodiment, the service provider selection engine 610 is a hardware module specifically constructed to perform the operations described herein. In various embodiments, the service provider selection engine 610 uses a weighted sum algorithm, fuzzy logic or probabilistic modeling to select the service provider best matching the attribute preferences provided by the user. The operation of the service provider selection engine 610 is described in more detail below with reference to FIGS. 10 and 11.

In one embodiment, the service provider selection engine 610 operates in one of four modes in response to input of a user preference. In a first mode (manual mode), the service provider selection engine 610 merely identifies the service providers that are available over the network and presents them in a list of the user. This is a list of all service providers available to perform any task and the service provider selection engine 610 does not provide filtering of any type. In a second mode (semi-automatic mode), the service provider selection engine 610 identifies service providers that are available on the network 104 and then filters the available service providers with user preferences about which attributes are most important to the user. In the second mode, a list of a limited number (e.g., 3 to 5 service providers) of service providers satisfying the preferences of the user are presented, and the user selects one of the service providers to perform the job or task. In a third mode of operation (automatic), the service provider selection engine 610 identifies the service providers that are available on the network 104, then selects a service provider that best matches the user input preferences about service provider attributes, and then sends the task or job to the selected service provider for completion. This process is fully automatic in that the user is not required to take any action after initially inputting in his preferences and the service provider selection module 432 automatically processes each step in the workflow. In a fourth mode of operation (automatic with blocking), the service provider selection engine 610 operates similar to the third mode just described above; however, at any later time a user can decide to block service providers from appearing on the list. For example, an OCR service provider who was selling his service so cheaply that it overrode other considerations might be blocked by a customer for poor service or a customer who used the service and did not like the results returned. In the same way customers refuse to ever work with a seller of services or goods again after a bad experience, users of this system can modify the automatic operation to remove providers with which they have had a bad experience.

Methods

Referring now to FIGS. 7-11, the methods of the present invention are described in more detail.

Referring now to FIGS. 7, 8A and 8B, one embodiment of a method 700 for displaying a graphical user interface (GUI) and collecting user preferences in accordance with the present invention is described. As shown in FIG. 7, the method begins with the service provider selection module 432 receiving 702 an input signal to begin entry of user preferences. In response, the user preference collector and GUI 602 communicates with the presentation module 322 of the computing pad 202 to display 704 a user interface 800 (See FIG. 8A) for selecting the level of a automatic processing.

FIGS. 8A and 8B show graphic representations of embodiments of a user interface 800, 850 for the level of automatic selection and service provider attribute selection in accordance with the present invention. While FIGS. 8A and 8B show the user interface 800 for the level of automatic selection is separate from the user interface 850 for service provider attribute selection, those skilled in the art will recognize that in other embodiments these two user interfaces 800, 850 could be combined into a single user interface that simultaneously presents the options for both selecting the level of automatic selection and the attributes of the service providers that are most important to the user.

Referring now to FIG. 8A, the user interface 800 for selecting the level of automatic provider selection will be described in more detail. As noted above in the discussion of the service provider selection engine 610, the present invention provides four modes of operation. These modes of operation correspond to different levels of the automatic selection of the service provider. The user can select from automatic, automatic with blocking, semi automatic or manual selection of the service providers. In fully automatic mode, the service provider selection engine 610 and the service provider selection module 432 automatically select the service provider to perform a task or job based on the user's preferences as to which attributes are most important. In the automatic with blocking, the service provider selection engine 610 and the service provider selection module 432 automatically select the service provider to perform a task or job based on the user's preferences as to which attributes are most important. Before the automatic selection is performed, the list of providers is filter to remove any blocked providers that have been specified by the user. In the semi-automatic mode, the service provider selection engine 610 and the service provider selection module 432 create a list of a limited number of service providers to perform a task or job based on the user preferences. The user then selects a service provider from the limited list of filtered service providers that satisfy the user preferences. In the manual mode, the service provider selection engine 610 cooperates with the service provider availability detector 606 to determine the service providers that are currently available to perform tasks or jobs. That unfiltered list of service providers that are available is presented to the user and the user must select a service provider perform the task or job. As shown in FIG. 8A, the user interface 800 displays a window which allows the user to select their mode of operation. The user interface 800 includes a series of labels 802, 812, 804, 808 corresponding to different levels of automatic selection and corresponding radio buttons for selection of one of the four modes of operation. In one embodiment, the user interface 800 allows the user to select only one mode of operation or its corresponding radio button. The user interface 800 also includes an input box for inputting the maximum number of results that the service provider selection engine 610 should include in the list for semi-automatic operation and a corresponding label 806. Once the user has selected the level of automatic service provider selection, the user selects the submit button 810 to send their selection to the user preference collector and GUI 602.

Referring back to FIG. 7, the method continues by receiving 706 the user input as to level of automatic selection that the service provider selection module 432 should perform. As noted above, this input is provided to the user preference collector and GUI 602 in response to the user selecting the submit button 810. The method continues by storing 708 the input received in step 706 in the user preference stored 604. Then the method continues by displaying 710 the user interface 850 for attribute selection and ranking.

An example of one embodiment of the user interface 850 for attribute selection and ranking is shown in FIG. 8B. Referring now also to FIG. 8B, the user interface 850 for the selection of provider attributes will be described in more detail. The user interface 850 includes a window having a plurality of columns with a first column listing the provider attribute(s) and a second column providing an input mechanism for the user to indicate the importance of that attribute (on the corresponding row). For example, as shown in FIG. 8B, the left-hand column includes a list of attributes: attribute A 852 to attribute N 852. In one embodiment, the rows of the first column can be selected by the user, and the user is presented with a drop-down menu listing all attributes of all providers. In this manner, the user may create its own list of the attributes which are of concern or importance to the user. The attribute lists includes any number of attributes from one to all the attributes. Furthermore, in another embodiment, the most important attributes are listed in order from most important to least important. In yet another embodiment, the attributes are listed in the first column in alphabetical order. As shown in FIG. 8B, the second or a right hand column includes an input mechanism for the user to indicate the importance of the attribute listed in the corresponding row. In this example, each attribute includes a corresponding slider bar 854 and a position indicator 856, 858, 860, 866 indicating a level of importance of the attribute, where a position to the left indicates lesser importance and a position to the right indicates greater or higher importance. For example, attribute A and attribute N 852 have a low-level importance as indicated by the position of marks 856, 866 while attribute B 852 has the highest level of importance as indicated by position mark 858 and attribute C 852 has a high level of importance close to that of attribute B 852 as indicated by position mark 860. The input mechanism of a slider bar and position mark are merely one method for indicating the importance of an attribute. In another embodiment, the input mechanism is inputting a number representing importance on the scale such as 1 to 5. Those skilled in the art will recognize that there are a variety of other implementations that could be used to indicate the importance of an attribute and the above are just to listen of a few examples. Proximate the bottom of the first column, the user interface 850 provides buttons 862, 864 for the addition or deletion of attributes. The user can select an attribute 852 from the first column and then select the delete button 864 and the attribute will be deleted from the list. Similarly, the user can select a row and then select the add button 862 and a menu or window will be presented to the user with a list of the available attributes. The user selects one of the listed attributes and is added to the list.

Referring back to FIG. 7, the method continues by receiving 712 input about a specific attribute and its importance. The method then stores 714 the received input from step 712 (the attribute and its importance) in the user preference storage 604. Next the method determines 716 whether a timeout condition has occurred or whether no more attributes are being modified. If either condition is true, the method is complete and ends. However, if the user is adding or removing attributes or modifying their importance, the method continues by updating 718 the user interface 850 and returning to step 710 to display an updated user interface for attribute selection. The method then repeat step 712, 714 and 716.

Referring now to FIG. 9, one embodiment of a method 900 for collecting and storing service provider attributes in accordance with the present invention is described. The method begins with the service provider attribute collector 608 requesting 902 information from a service provider and storing the response in the service provider attribute storage 612. Next, the service provider attribute collector 608 monitors 904 the stroke and image workflow server 106 for requests for a service provider. For each request for a service provider generated by the stroke and image workflow server 106, the service attribute collector 608 creates a record and stores the record in the service provider attribute storage 612. The sending of the request by the stroke and image workflow server 106 is the first step in gathering information about and completing a record of statistics about how the request was responded to and completed. Next the method identifies 906 the service provider that accepts the request for a service provider from the stroke and image workflow server 106. In one embodiment, the service provider attribute collector 608 provides a unique identification number for each service provider. The unique service provider identification number is stored in the service provider attribute storage 612. Next, the method captures 908 statistics related to the completion of the request for a service provider. For example, information such as the time the request was accepted, the time the documents were delivered to the service provider, the time at which the response was provided by the service provider, the size of the documents before and after processing, the size of the response or results and other statistics relevant to the performance of the job or task are captured. For example, methods for capturing such information are disclosed in U.S. patent application Ser. No. 12/555,663, entitled "Paper-Like Forms Processing System & Method," filed on Sep. 8, 2009; U.S. patent application Ser. No. 12/555,669, entitled "Device Enabled Verifiable Stroke And Image Based Workflows," filed on Sep. 8, 2009; U.S. patent application Ser. No. 12/555,675 entitled "Stroke And Image Aggregation And Analytics," filed on Sep. 8, 2009 and U.S. patent application Ser. No. 12/555,683, entitled "Multi-provider Forms Processing System with Quality of Service," filed on Sep. 8, 2009, which are incorporated by reference in its entirety. Next, the method continues by storing 910 the identified service provider in the statistics at the service provider attribute stored 612. Next the method determines 912 whether there are additional requests for service providers that have been sent out by the stroke and image workflow server 106. If so, the method returns to step 904 and repeat steps 906 through 912 for the next request. If not, the method continues in step 914 to request performance feedback from the user and to store the user feedback in the service provider attribute stored 612. After step number four the method is complete and ends. Those skilled in the art will recognize that the process described above with reference to FIG. 9 collects three types of data: data from the service provider, data from the user, and data is automatically connected from operations of the image workflow server 106, the portable computing devices 102 and the service provider computers 122. It should be understood that the collection of these different types of data can be performed in any order. For example, step 902, steps 904 to 912, and step 914 may be informed in different orders than that described above. Furthermore, those skilled in the art will recognize that the statistics are automatically gathered from different components of the system 100 can be performed in other ways such as automatic reporting to the service provider attribute collector 608 by the other components of the system.

Referring now to FIGS. 10 and 11, two modes of operation for the service provider selection engine 610 and the service provider selection module 432 will be described. The service provider selection engine 610 accesses the user preference storage 604 to determine which mode of operation will be used for selection of a service provider for a particular user that has workflow tasks to be assigned and performed by the stroke and image workflow server 106. The service provider selection engine 610 reads the user preference as to the level of automatic selection from the user preference storage 604 and sets the mode of operation for this user according to the user's settings. This will result in the service provider selection engine 610 operating in either manual mode, semi-automatic mode or automatic mode. The operation of the service provider selection engine 610 in manual mode has been described above in that description will not be repeated here. The operation of the service provider selection engine 610 in automatic mode is described below with reference to FIG. 10 and the operation of the service provider selection engine in semi automatic mode is described below with reference to FIG. 11.

Referring now to FIG. 10, one embodiment of a method automatic selection of a service provider in accordance with the present invention is described. The method begins by collecting and storing 1002 user preferences for automatic selection of service providers, attributes of importance to the user and the importance ranking of each attribute. One method for performing this step has been described above with reference to FIG. 7. Next, the method collects and stores 1004 the attributes of service providers. One method performing this step has been described above with reference to FIG. 9. Next the method identifies 1006 a service request to be performed for a user or requestor. Then the service provider availability detector 606 determines 1008 and generates a list of service providers that are currently connected to the network 104 and available to perform the service request. Next, the service provider selection engine 610 dynamically determines the best service provider to perform the service requested by comparing the user preferences retrieved from user preference storage 604 and the service provider attributes retrieved from service provider attribute stored 612. In this method where the selection of the service provider is fully automatic, the service provider selection engine 610 need only determine a best match between the attributes of the available service providers and the attribute preferences of the user. This determination may be made in a number of ways.

In one embodiment, the service provider selection engine 610 determines the best service provider to perform the service requested by calculating a weighted sum for each service provider and selecting the service provider that has the highest weighted sum. In one embodiment, the service providers are first filter so that only the service provides that provide a service that matches the request task or job have a weighted sum calculated. For example, for each possible alternative service provider, the set of measured parameters or attributes P of choice are assigned weighting factors W indicating their relative importance. The observed value is multiplied by the weighting factor, and a sum S is computed:

$$S = \sum_{i=1}^{n} W_i P_i$$

The service provider with the highest sum S is chosen as the best service provider.

In another embodiment, the service provider selection engine 610 determines the best service provider to perform the service requested using fuzzy logic. In this embodiment, Fuzzy Logic (e.g., as described in Zadeh, L. A. (1965). "Fuzzy sets", *Information and Control* 8 (3): 338-353.) is used to choose among alternatives. Each parameter or attribute P is assigned a range of values which represent some fuzzy state. For example, a parameter called throughput might be measured in terms of the number of seconds the application runs on average before accomplishing its task. A second parameter, called quality, might measure the number of customer rejections per thousand tasks performed. Further rules might specify desirability in terms of these fuzzy states. These rules might be expressed in FCL (A language for expressing fuzzy logic expressions created by the International Electrotechnical Commission (IEC). For example, the following FCL pseudo code might specify a simple set of fuzzy logic rules for choosing services based on speed, but rejecting poor quality services.

```
FUNCTION_BLOCK
    VAR_INPUT
        Quality      REAL; (* RANGE(0 .. 100) *) (* %rejects *)
        Throughput   REAL; (* RANGE(0 .. 100) *) (* total seconds *)
    END_VAR
    VAR_OUTPUT
        Desirability   REAL; (* RANGE(0 .. 4) *)
    END_VAR
    FUZZIFY Quality
        TERM Poor := (0, 0) (0, 1) 95, 0) ;
        TERM Good := (90, 0) (95, 1) (99, 0) ;
        TERM Excellent := (95, 0) (100, 1) (100, 0) ;
    END_FUZZIFY
    FUZZIFY Throughput
        TERM Fast := (0, 0) (0.1, 1) (1, 0) ;
        TERM Reasonable := (0.5, 0) (5, 1) (10, 0) ;
        TERM Slow := (5, 0) (60, 1) ;
    END_FUZZIFY
    FUZZIFY Desirability
        TERM High := 1 ;
        TERM Acceptable := 2 ;
        TERM Reject := 3 ;
    END_FUZZIFY
    DEFUZZIFY Desirability
        METHOD: COG;
    END_DEFUZZIFY
    RULEBLOCK first
    AND:MIN;
    ACCU:MAX;
    RULE 0: IF (Throughput IS Fast) AND (Quality IS Excellent) THEN
       (Desirability IS High);
    RULE 1: IF (Throughput IS Reasonable) AND (Quality IS Excellent)
       THEN (Desirability IS High);
    RULE 2: IF (Throughput IS Slow) AND (Quality IS Excellent)
    THEN
       (Desirability IS Acceptable);
    RULE 3: IF (Throughput IS Slow) AND (Quality IS Good) THEN
       (Desirability IS Acceptable);
    RULE 4: IF (Quality IS Poor)   THEN (Desirability IS Reject);
    END_RULEBLOCK
    END_FUNCTION_BLOCK
```

Given this control syntax, any of a number of Fuzzy Logic systems might be developed, based on the parameters provided, of which this is only one embodiment.

In yet another embodiment, the service provider selection engine 610 determines the best service provider to perform the service requested using probabilistic modeling. In this embodiment, an expert system is used to choose among possible service providers. In this embodiment, ranges for each parameter or attribute P are used to assign a probability that the application should be recommended. Bayesian rules of inference are used to combine these probabilities into a final probability that the application should be recommended. There are several methods for developing such rules, the most common being "forward chained" expert system rules or "backwards chained" expert system rules. Such rules look like if-then statements, such as the statement: "If speed is <0.1 then desirability is high". Those skilled in the art will also note that a variety of other mathematical techniques, such as classical decision theory[1], Dempster-Shafer[2,3] decision theory, and possibility theory[4] provide alternative algorithms which can be used to decide among various complex alternatives, and might be applied in this case.

[1] Paul Anand (1993). *Foundations of Rational Choice Under Risk*. Oxford: Oxford University Press. ISBN 0198233035. (an overview of the philosophical foundations of key mathematical axioms in subjective expected utility theory—mainly normative)

[2] Shafer, Glenn; *A Mathematical Theory of Evidence*, Princeton University Press, 1976, ISBN 0-608-02508-9

[3] Dempster, A. P. (1967). "Upper and lower probabilities induced by a multi-valued mapping". *The Annals of Mathematical Statistics* 38 (2): 325-339. doi:10.1214/aoms/1177698950

[4] Zadeh, Lotfi, "Fuzzy Sets as the Basis for a Theory of Possibility", *Fuzzy Sets and Systems* 1:3-28, 1978. (Reprinted in Fuzzy Sets and Systems 100 (Supplement): 9-34, 1999.)

Referring back to FIG. 10, the method 1000 completes by sending 1012 to request to the dynamically determined best service provider for completion.

Referring now to FIG. 11, one embodiment of a method 1100 for semi-automatic selection of a service provider in accordance with the present invention is described. The method begins by collecting and storing 1002 user preferences, collecting and storing 1004 attributes of service providers, identifying 1006 a service request, and determining 1008 a list of service providers. The steps 1002, 1004, 1006 and 1008 are the same as the steps described above with reference to figure cancer that description will not be repeated here. Next, the method dynamically filters 1102 the list of service providers that are currently connected to the network and available to perform a service request. For example, the method dynamically filters the list of available service providers by comparing the preferences of the user and the service provider attributes. In one embodiment, this dynamic filtering step is performed in a manner similar to that described above with reference to FIG. 10 for determining the best service provider. In other words, the list of service providers can be dynamically filtered using a weighted sum algorithm, fuzzy logic, or probabilistic modeling. For example, if a weighted sum algorithm is used, rather than choosing the service provider with the highest weighted sum, the method of step 1102 would generate a list of service providers that have the highest a weighted sum values. This embodiment provides a list of the top k items whose sum S is highest, where k. is the number of items requested by the user. For example, if the user has set as a preference to produce and list the three best matches, the method would generate a list of the service providers with the three highest weighted sum values. Similarly, fuzzy logic or published at modeling can be used to generate a list of the service providers that best match the attribute preferences of the user. Either of these techniques can also produce lists of varying length according to the preference of the user. The method continues by presenting 1104 the short list of service providers to the requester. This can be done with the service provider selection engine 610 providing the list for presentation to the user by the presentation module 322. The portable computing device 102 receives an input selection from the user as to the service provider from the short list of service providers. The portable computing device 102 sends the input to the service provider selection engine 610. The service provider selection engine 610 receives 1106 the selection of the service provider, and sends 1108 the service request to the selective service provider for completion and the method ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer implemented method comprising:
receiving collected user preferences including an indication of importance of each attribute for attributes of a plurality of service providers;
receiving collected attributes for the plurality of service providers;
receiving an annotation for a document on a computing pad of a portable computing system, by at least capturing a sequence of points or segments of strokes made by a stylus on the computing pad of the portable computing system;
determining, with one or more processors, a first job in a workflow by extracting page metadata associated with a first page of the annotated document that includes workflow instructions and status;
determining, with the one or more processors, a second job in the workflow by extracting page metadata associated with a second page of the annotated document that includes the workflow instructions and status;
determining, with the one or more processors, a first service provider to perform the first job and a second service provider to perform the second job by comparing the user preferences to the attributes based on the importance of each attribute, wherein determining the first and second service providers includes assigning respective probabilities to select each of the plurality of service providers based on the user preferences for each attribute of the respective service provider, combining the respective probabilities using an expert system rule to determine a final probability to select the respective service provider, and selecting, based on the final probability associated with each of the plurality of service providers, the first and second service providers with attributes that best match the user preferences among the plurality of service providers that perform the first job and the plurality of service providers that perform the second job; and sending the first and second jobs to the first and second service providers for performance of the first and second jobs.

2. The method of claim 1, further comprising determining a list of service providers from the plurality of service providers that are currently connected to a network and available to perform the first and second jobs, and wherein determining the first and second service providers to perform the first and second jobs is based on the list of service providers.

3. The method of claim 1, wherein determining the first and second service providers is automatic.

4. The method of claim 1, wherein:
determining the first and second service providers is semi-automatic and includes generating a list having a defined number of service providers to perform the first and second jobs, the list of service providers having attributes that best match the user preferences, and
the method includes receiving from a user a selection of the first and second service providers from the list, and sending the first and second jobs to the selected service providers.

5. The method of claim 1, wherein the first and second service providers are determined by calculating a weighted sum for each service provider.

6. The method of claim 1, wherein the first and second service providers are determined using fuzzy logic.

7. The method of claim 1, wherein extracting page metadata associated with the first and second pages of the annotated document includes extracting first page metadata independently associated with the first page of the annotated document and extracting second page metadata independently associated with the second page of the annotated document.

8. A computer program product comprising a non-transitory computer usable medium including a computer readable program, wherein the computer readable program when executed on a computer causes the computer to:
receive collected user preferences including an indication of importance of each attribute for attributes of a plurality of service providers;
receive collected attributes for the plurality of service providers;
receive an annotation for a document on a computing pad of a portable computing system by capturing a sequence of points or segments of strokes made by a stylus on the computing pad of the portable computing system;
determine a first job in a workflow by extracting page metadata associated with a first page of the annotated document that includes workflow instructions and status;
determine a second job in the workflow by extracting page metadata associated with a second page of the annotated document that includes the workflow instructions and status;
determine a first service provider to perform the first job and a second service provider to perform the second job by comparing the user preferences to the attributes based on the importance of each attribute, wherein determining the first and second service providers includes assigning respective probabilities to select each of the plurality of service providers based on the user preferences for each attribute of the respective service provider, combining the respective probabilities using an expert system rule to determine a final probability to select the respective service provider, and selecting, based on the final probability associated with each of the plurality of service providers, the first and second service providers with attributes that best match the user preferences among the plurality of service providers that perform the first job and the plurality of service providers that perform the second job; and
send the first and second jobs to the first and second service providers for performance of the first and second jobs.

9. The computer program product of claim 8, wherein the computer readable program when executed on the computer also causes the computer to:
determine a list of service providers from the plurality of service providers that are currently connected to a network and available to perform the first and second jobs, and
wherein the computer determines the first and second service providers to perform the first and second jobs using the list of service providers.

10. The computer program product of claim 8, wherein determining the first and second service providers is automatic.

11. The computer program product of claim 8, wherein:
determining the first and second service providers is semi-automatic and includes generating a list having a defined number of service providers to perform the first and second jobs, the list of service providers having attributes that best match the user preferences, and
the computer receives from a user a selection of the first and second service providers from the list, and sends the first and second jobs to the selected service providers.

12. The computer program product of claim 8, wherein the computer determines the first and second service providers to perform the first and second jobs by calculating a weighted sum for each service provider.

13. The computer program product of claim 8, wherein the computer determines the first and second service providers to perform the first and second jobs using fuzzy logic.

14. The computer program product of claim 8, wherein extracting page metadata associated with the first and second pages of the annotated document includes extracting first page metadata independently associated with the first page of the annotated document and extracting second page metadata independently associated with the second page of the annotated document.

15. A system comprising:
one or more processors;
a user preference collector stored on a memory and executable by the one or more processors, the user preference collector for receiving collected user preferences including an indication of importance of each attribute for attributes of a plurality of service providers, the user preference collector coupled to receive the user preferences from a user;
a service provider attribute collector for monitoring performance of the plurality of service providers in completing jobs and receiving collected attributes for the plurality of service providers, the service provider attribute collector coupled to the plurality of service providers;
a document transfer module for receiving an annotated document from a portable computing system, the annotated document includes a captured sequence of points or segments of strokes of a stylus on a computing pad of the portable computing system;
a workflow module for determining a first job in a workflow by extracting page metadata associated with a first page of the annotated document that includes workflow instructions and status and determining a second job in the workflow by extracting page metadata associated with a second page of the annotated document that includes the workflow instructions and status; and a service provider selection engine for determining a first service provider to perform the first job and a second service provider to perform the second job by comparing the user preferences to the attributes based on the importance of each attribute, wherein determining the first and second service providers includes assigning respective probabilities to select each of the plurality of service providers based on the user preferences for each attribute of the respective service provider, combining the respective probabilities using an expert system rule to determine a final probability to select the respective service provider, and selecting, based on the final probability associated with each of the plurality of service providers, the first and second service providers with attributes that best match the user preferences among the plurality of service providers that perform the first job and the plurality of service providers that perform the second job, the service provider selection engine coupled for communication with the service provider attribute collector and the user preference collector.

16. The system of claim 15, further comprising a service provider availability detector for monitoring a network to determine which service providers are accessible and available for performing the first and second jobs, the service provider availability detector coupled to the plurality of service providers and the service provider selection engine.

17. The system of claim 15, wherein the user preference collector cooperates with a presentation module of the portable computing system to generate a graphic user interface that allows the user to input a preference for automatic, semi-automatic or manual operation of the service provider selection engine.

18. The system of claim 15, wherein the user preference collector cooperates with a presentation module of the portable computing system to generate a graphic user interface that allows the user to input an attribute and a corresponding level of importance for the attribute.

19. The system of claim 15, further comprising:
a user preference storage for storing the user preferences and other information, the user preference storage coupled to the user preference collector to receive and store information and coupled to provide the information to the service provider selection engine;
a service provider attribute storage for storing the attributes about the completion and performance of jobs by the plurality of service providers, the service provider attribute storage coupled to the service provider attribute collector to receive and store service provider attribute information and coupled to provide the service provider attribute information to the service provider selection engine; and
wherein the service provider selection engine is coupled to the user preference storage to retrieve the user preferences and the other information and is coupled to the service provider attribute storage to retrieve the information about the attributes and their importance to the user.

20. The system of claim 15, wherein the service provider selection engine uses at least one of a weighted sum algorithm or fuzzy logic to select the first and second service providers to perform the first and second jobs.

* * * * *